United States Patent
Yoshida

(10) Patent No.: US 11,307,792 B2
(45) Date of Patent: Apr. 19, 2022

(54) INFORMATION PROCESSING APPARATUS USING DATA CORRELATION FOR DATA STORAGE, COMPUTER-READABLE RECORDING MEDIUM RECORDING STORAGE CONTROL PROGRAM USING DATA CORRELATION FOR DATA STORAGE, AND STORAGE SYSTEM USING DATA CORRELATION FOR DATA STORAGE

(71) Applicant: FUJITSU LIMITED, Kawasaki (JP)

(72) Inventor: Taketoshi Yoshida, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 16/720,061

(22) Filed: Dec. 19, 2019

(65) Prior Publication Data

US 2020/0233603 A1 Jul. 23, 2020

(30) Foreign Application Priority Data

Jan. 22, 2019 (JP) .............................. JP2019-008583

(51) Int. Cl.
*G06F 3/06* (2006.01)

(52) U.S. Cl.
CPC ............ *G06F 3/0652* (2013.01); *G06F 3/061* (2013.01); *G06F 3/0604* (2013.01); *G06F 3/0611* (2013.01); *G06F 3/0682* (2013.01)

(58) Field of Classification Search
CPC ..... G06F 3/0652; G06F 3/0604; G06F 3/0682
See application file for complete search history.

(56) References Cited

U.S. PATENT DOCUMENTS

| | | | |
|---|---|---|---|
| 2010/0198773 A1* | 8/2010 | Wallisch | G06Q 30/02 706/54 |
| 2014/0304277 A1* | 10/2014 | Veugen | G06F 16/40 707/748 |
| 2015/0046385 A1 | 2/2015 | Shimizu et al. | |
| 2015/0186048 A1 | 7/2015 | Kobashi et al. | |
| 2018/0101413 A1* | 4/2018 | Watanabe | G06F 9/505 |
| 2018/0143764 A1* | 5/2018 | Araki | G06F 3/0685 |

FOREIGN PATENT DOCUMENTS

| | | |
|---|---|---|
| JP | 2015-036865 | 2/2015 |
| JP | 2015-125597 | 7/2015 |

* cited by examiner

*Primary Examiner* — Andrew J Cheong
(74) *Attorney, Agent, or Firm* — Fujitsu Patent Center

(57) ABSTRACT

An information processing apparatus includes: a memory; and a processor coupled to the memory and configured to: perform control to store data on the memory; determine a correlation between a plurality of pieces of data, based on pieces of attribute information of the plurality of pieces of data, wherein dispose pieces of data having a high correlation among the plurality of pieces of data at neighboring locations on the memory.

9 Claims, 24 Drawing Sheets

FIG. 4

| USER ID | USER NAME |
|---|---|
| 10 | yoshida |
| 20 | saitou |
| 30 | kobayashi |

| USER ID | USER ID | | | |
|---|---|---|---|---|
| | 10 | 20 | 30 | ... |
| 10 | 1.0 | – | – | – |
| 20 | 0.8 | 1.0 | – | – |
| 30 | 0.9 | 0.2 | 1.0 | – |
| ... | ... | ... | ... | ... |

| PROCESS ID | PROCESS NAME |
|---|---|
| 50 | sparc |
| 60 | kibana |
| 70 | logstash |

| PROCESS ID | PROCESS ID | | | |
|---|---|---|---|---|
| | 50 | 60 | 70 | ... |
| 50 | 1.0 | – | – | – |
| 60 | 0.2 | 1.0 | – | – |
| 70 | 1.0 | 0.5 | 1.0 | – |
| ... | ... | ... | ... | ... |

| OBJECT ID | OBJECT ID | | |
|---|---|---|---|
| | OBJ.10v | OBJ.20v | OBJ.30v |
| OBJ.10v | 1.0 | – | – |
| OBJ.20v | 0.759 | 1.0 | – |
| OBJ.30v | 0.651 | 0.780 | 1.0 |

FIG. 9

| OBJECT NAME | OBJECT ID | WRITE FREQUENCY (P1) | READ FREQUENCY (P2) | GENERATION TIME (P3) | USER ID (P4) | PROCESS ID (P5) | EVENT ID (P6) |
|---|---|---|---|---|---|---|---|
| OBJ1 | OBJ.1v | 69 | 41 | 10:20(0.430556) | 10.0 | 50.0 | 2 |
| OBJ2 | OBJ.2v | 77 | 88 | 10:23(0.432639) | 20.0 | 60.0 | 2 |
| OBJ3 | OBJ.3v | 90 | 33 | 10:25(0.434028) | 10.20 | 50.60 | 2 |

FIG. 11

| USER ID | USER ID | | | | |
|---|---|---|---|---|---|
| | 0 | 10 | 20 | 30 | ... |
| 0 | 1.0 | - | - | - | - |
| 10 | 1.0 | 1.0 | - | - | - |
| 20 | ... | 1.0 | 1.0 | - | - |
| 30 | ... | ... | ... | 1.0 | - |
| ⋮ | ... | ... | ... | ... | 1.0 |

FIG. 12

| PROCESS ID | PROCESS ID | | | | | |
|---|---|---|---|---|---|---|
| | 0 | ... | 50 | 60 | 70 | ... |
| 0 | 1.0 | - | - | - | - | - |
| ⋮ | ... | ... | - | - | - | - |
| 50 | - | - | 1.0 | - | - | - |
| 60 | ... | ... | 0.8 | 1.0 | - | - |
| 70 | ... | ... | ... | ... | 1.0 | - |
| ⋮ | ... | ... | ... | ... | ... | 1.0 |

FIG. 13

| OBJECT NAME | OBJECT ID | WRITE FREQUENCY | READ FREQUENCY | GENERATION TIME | USER ID | PROCESS ID | EVENT ID |
|---|---|---|---|---|---|---|---|
| OBJ10 | OBJ.10v | 69 | 90 | 10:20(0.430556) | 10 | 40 | 02 |
| OBJ20 | OBJ.20v | 77 | 88 | 10:23(0.432639) | 50 | 60 | 02 |
| OBJ30 | OBJ.30v | 70 | 93 | 10:25(0.434028) | 40 | 80 | 02 |

DEGREE OF SIMILARITY (INITIAL VALUE)

| OBJECT ID | OBJECT ID | | |
|---|---|---|---|
| | OBJ.10v | OBJ.20v | OBJ.30v |
| OBJ.10v | 1.0 | - | - |
| OBJ.20v | 0.659 | 1.0 | - |
| OBJ.30v | 0.551 | 0.480 | 1.0 |

CALCULATE DEGREE OF SIMILARITY BY USING CORRECTED INTER-PROCESS WEIGHT (b)

DEGREE OF SIMILARITY (AFTER CORRECTION)

| OBJECT ID | OBJECT ID | | |
|---|---|---|---|
| | OBJ.10v | OBJ.20v | OBJ.30v |
| OBJ.10v | 1.0 | - | - |
| OBJ.20v | 0.854 | 1.0 | - |
| OBJ.30v | 0.899 | 0.920 | 1.0 |

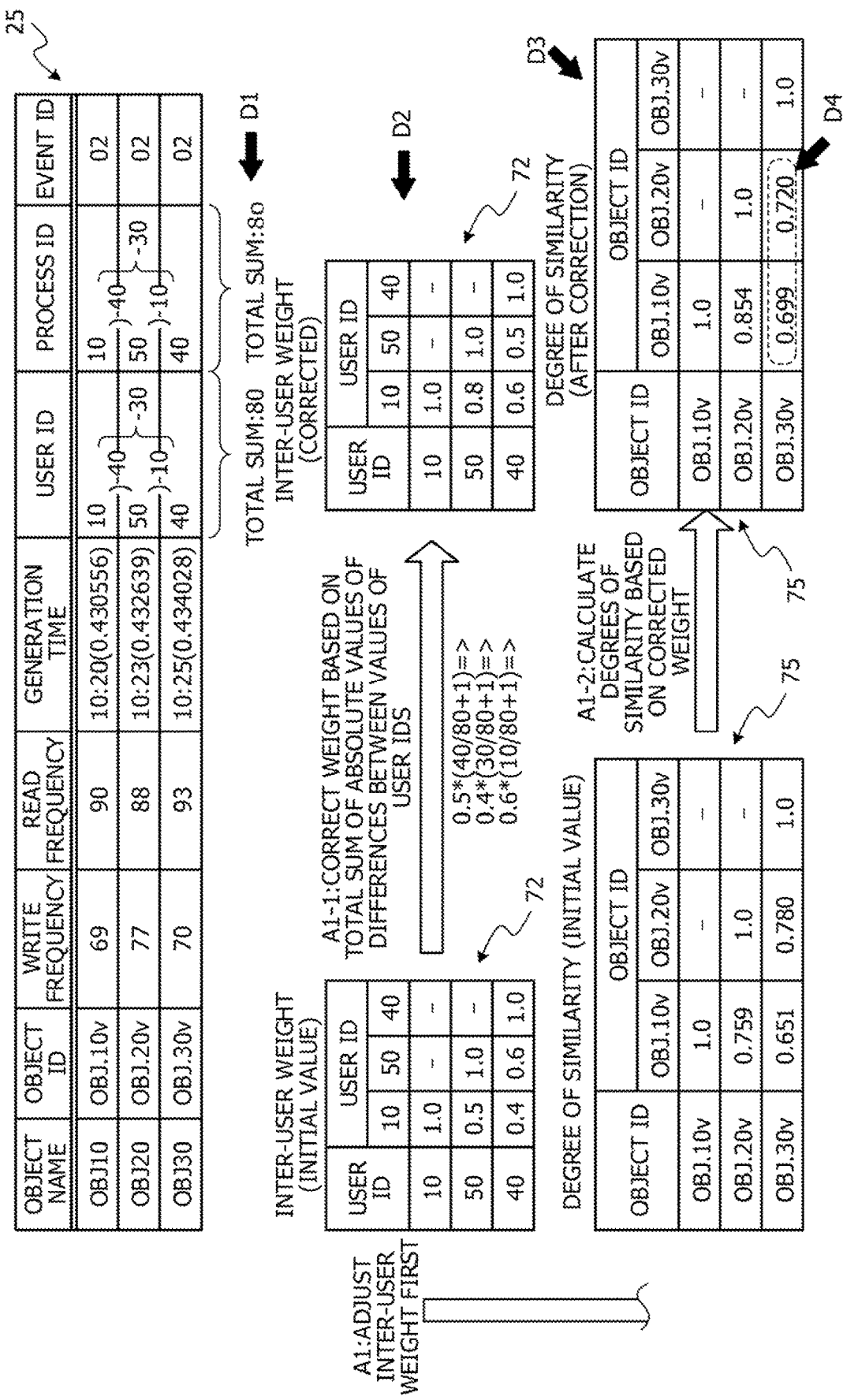

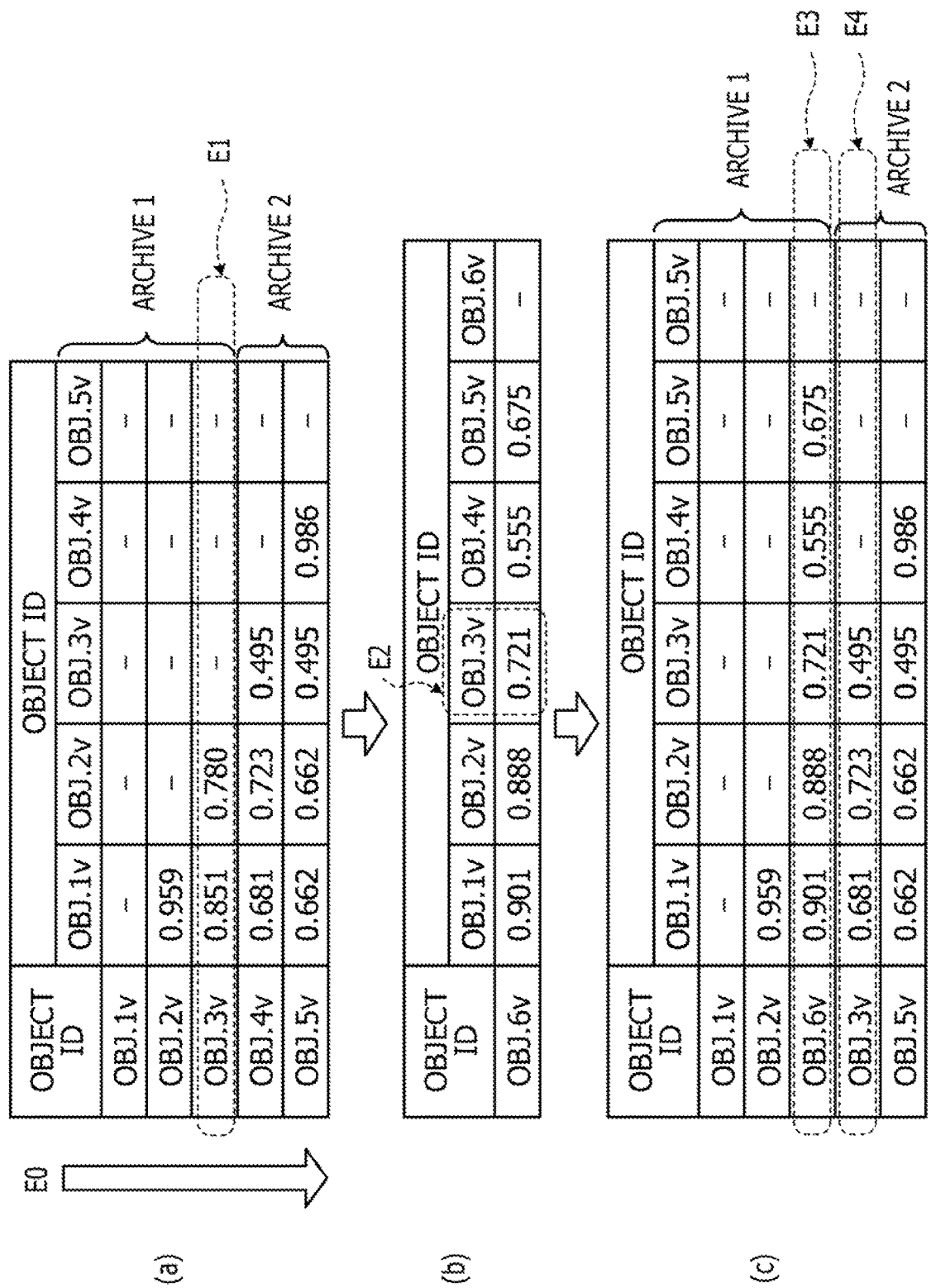

INFORMATION PROCESSING APPARATUS USING DATA CORRELATION FOR DATA STORAGE, COMPUTER-READABLE RECORDING MEDIUM RECORDING STORAGE CONTROL PROGRAM USING DATA CORRELATION FOR DATA STORAGE, AND STORAGE SYSTEM USING DATA CORRELATION FOR DATA STORAGE

CROSS-REFERENCE TO RELATED APPLICATION

This application is based upon and claims the benefit of priority of the prior Japanese Patent Application No. 2019-8583, filed on Jan. 22, 2019, the entire contents of which are incorporated herein by reference.

FIELD

The embodiment discussed herein is related to an information processing apparatus, a computer-readable recording medium, and a storage system.

BACKGROUND

Development of a system that uses an object storage for managing data in units of objects is widely carried out. When an object is written on a medium of a sequential access type (hereinafter referred to as a sequential access medium) such as a magnetic tape in such a system that uses an object storage, the object is often appended to an object written immediately before.

Examples of the related art are described in Japanese Laid-open Patent Publication No, 2015-36865 and Japanese Laid-open Patent Publication No. 2015-125597.

SUMMARY

According to an aspect of the embodiment, an information processing apparatus includes: a memory; and a processor coupled to the memory and configured to: perform control to store data on the memory; determine a correlation between a plurality of pieces of data, based on pieces of attribute information of the plurality of pieces of data, wherein dispose pieces of data having a high correlation among the plurality of pieces of data at neighboring locations on the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating user ID information used in the storage system serving as the one example of the embodiment;

FIG. 5 is a diagram illustrating user-related weight information used in the storage system serving as the one example of the embodiment;

FIG. 6 is a diagram illustrating process ID information used in the storage system serving as the one example of the embodiment;

FIG. 7 is a diagram illustrating process-related weight information used in the storage system serving as the one example of the embodiment;

FIG. 8 is a diagram illustrating degree-of-similarity information used in the storage system serving as the one example of the embodiment;

FIG. 9 is a diagram illustrating meta-information used in the storage system serving as the one example of the embodiment;

FIG. 11 is a diagram illustrating the user-related weight information used in the storage system serving as the one example of the embodiment;

FIG. 12 is a diagram illustrating the process-related weight information used in the storage system serving as the one example of the embodiment;

FIG. 13 is a diagram illustrating meta-information used in the. storage system serving as the one example of the embodiment;

Figure 14:
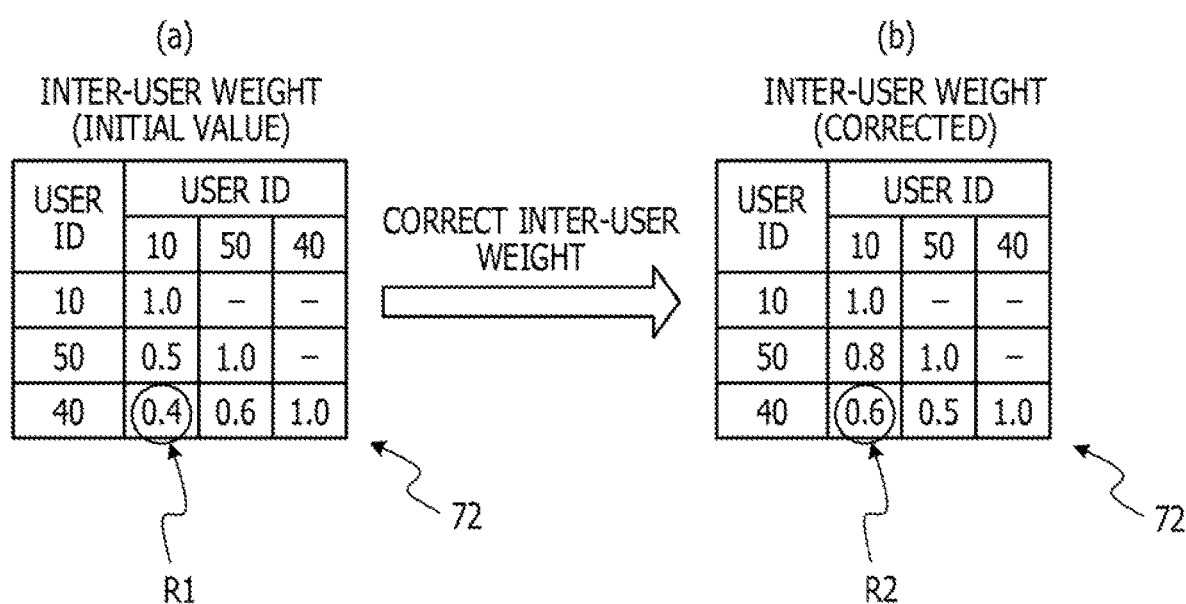
Figure 15:
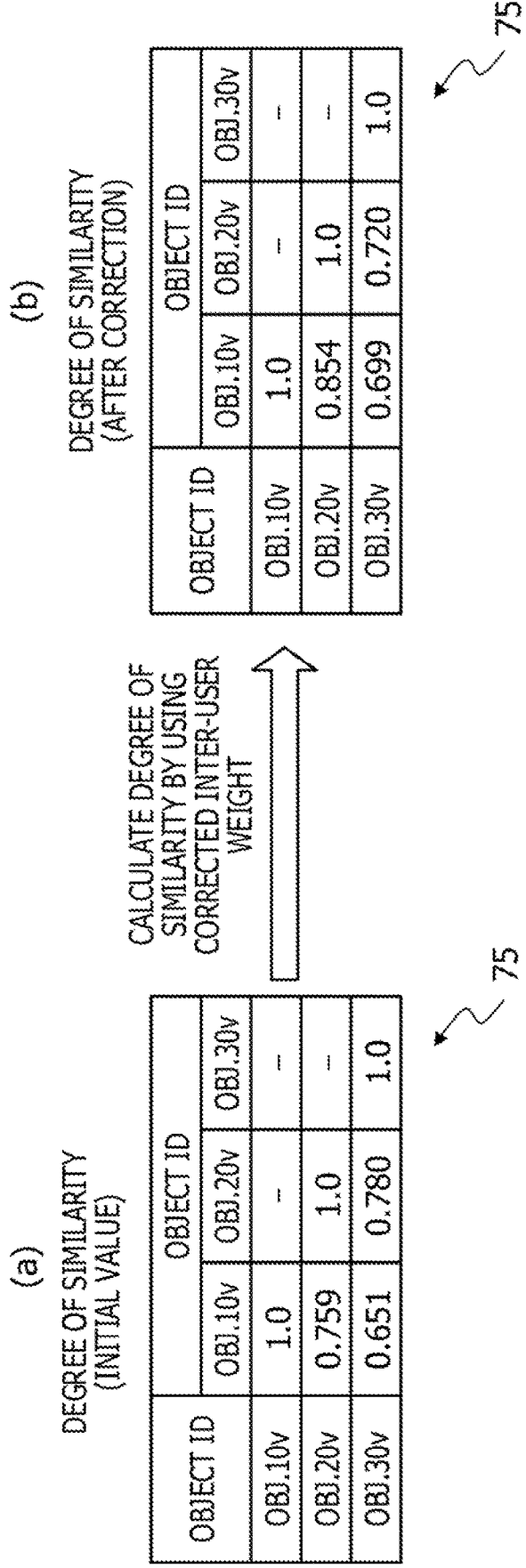
Figure 16:
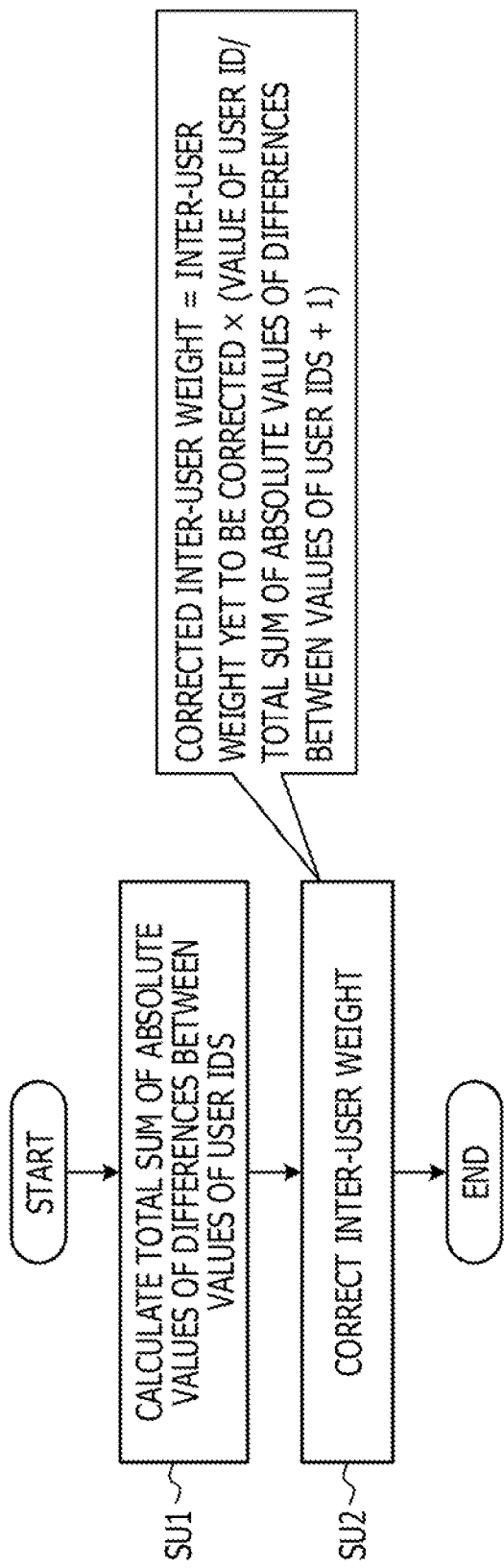
Figure 17:
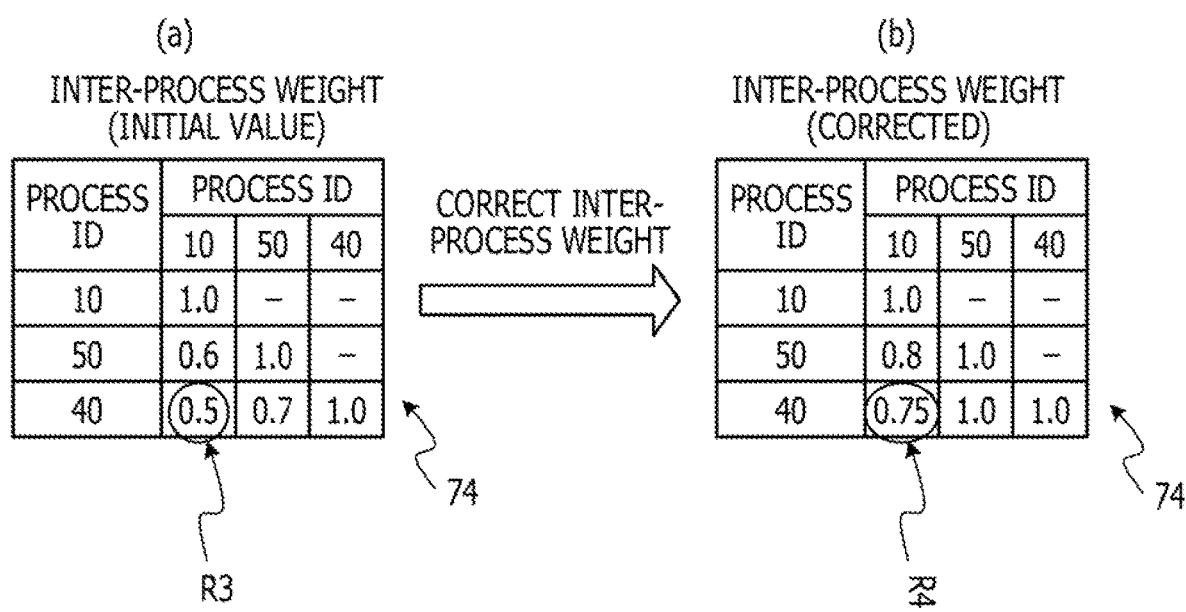
Figure 19:
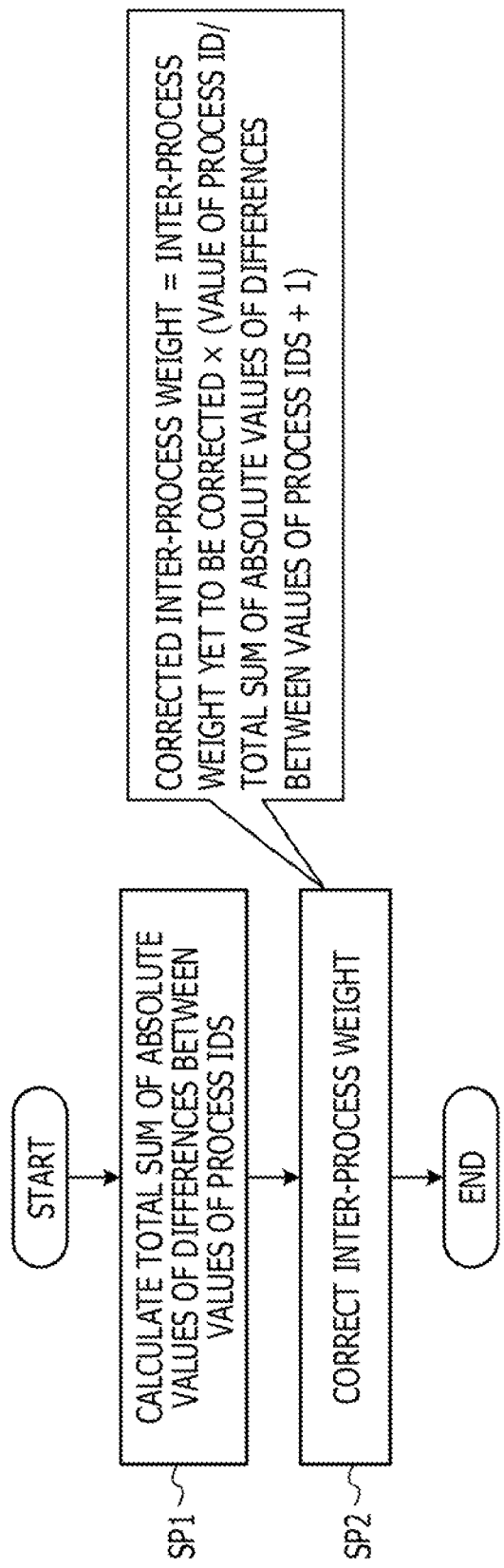
Figure 20:
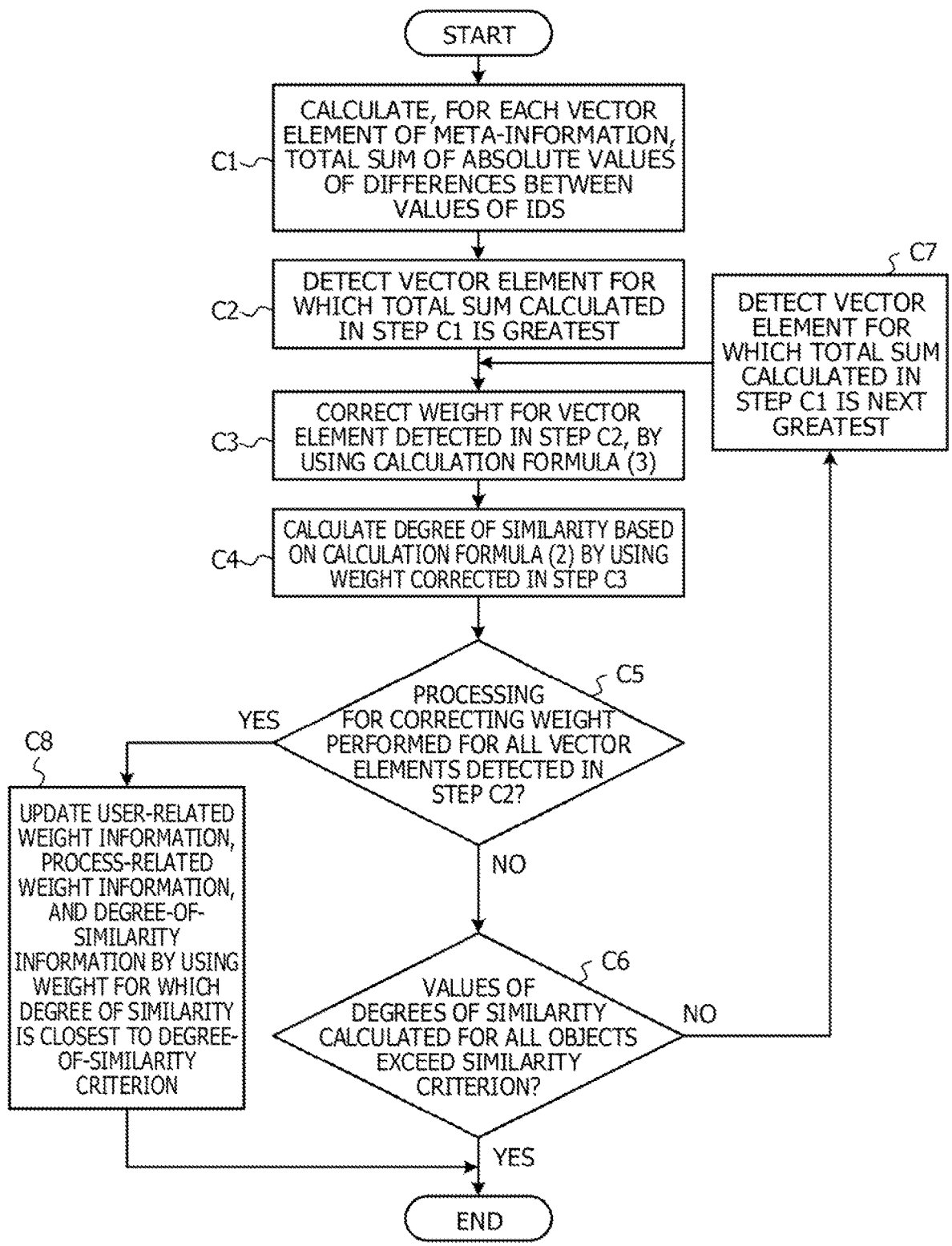
Figure 21B:
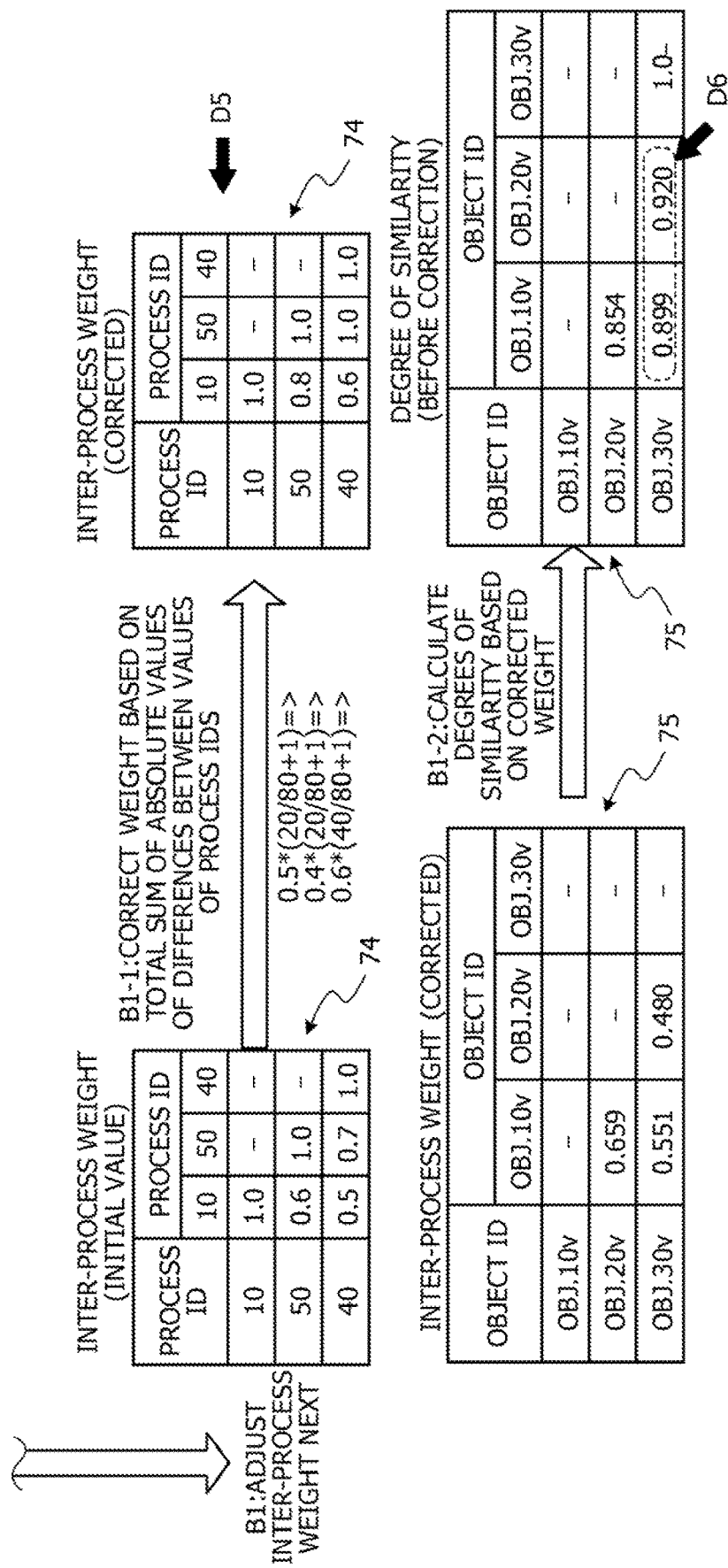
Figure 22:
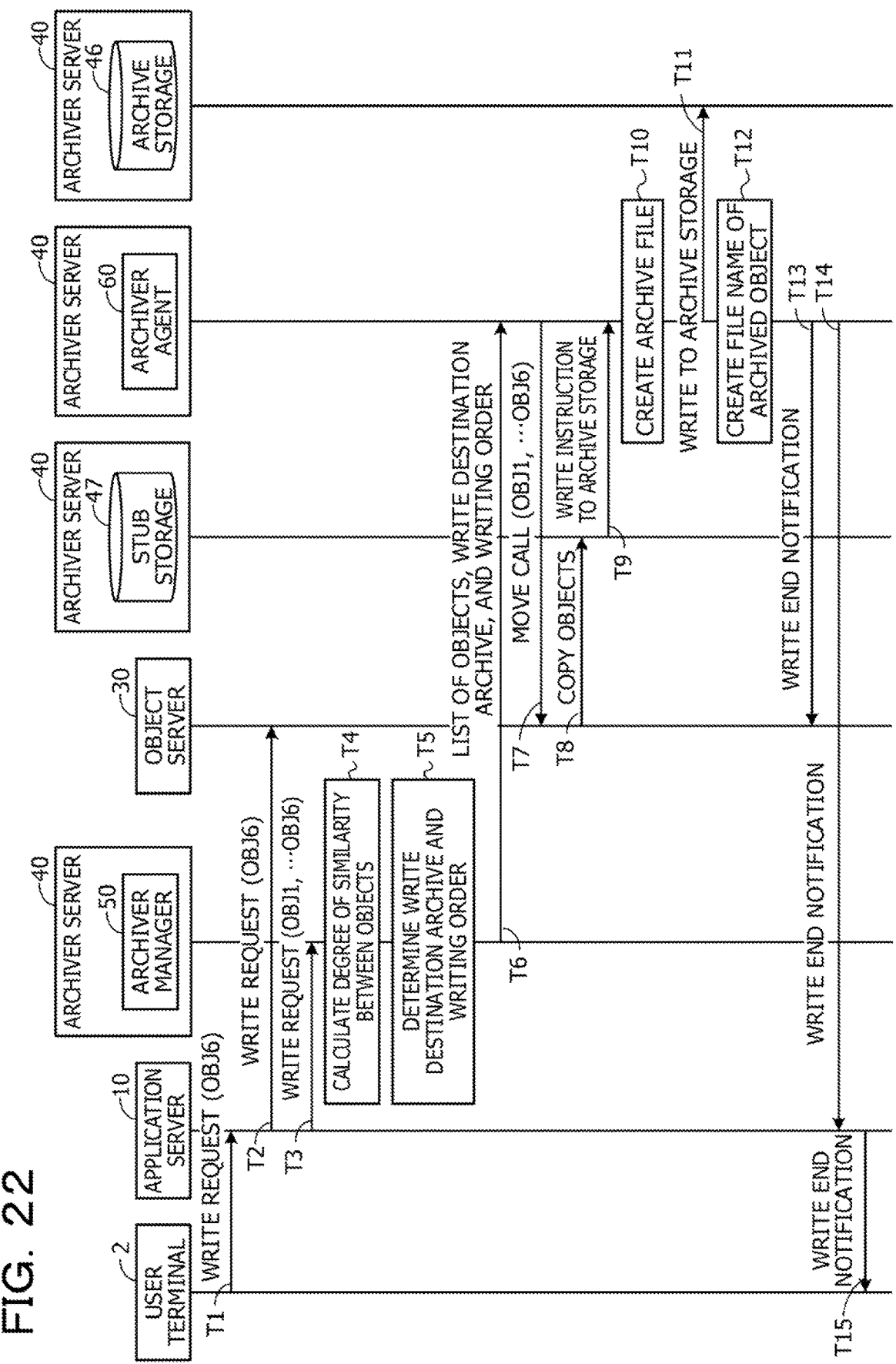

Part (a) of FIG. 14 is a diagram illustrating the user-related weight information that is yet to be corrected in the storage system serving as the one example of the embodiment, and part (b) of FIG. 14 is a diagram illustrating the user-related weight information that has been corrected in the storage system serving as the one example of the embodiment;

Part (a) of FIG. 15 is a diagram illustrating the degree of similarity calculated before the correction is made in the storage system serving as the one example of the embodiment, and part (b) of FIG. 15 is a diagram illustrating the degree of similarity calculated after the correction is made in the storage system serving as the one example of the embodiment;

FIG. 16 is a flowchart illustrating processing for correcting an inter-user weight in the storage system serving as the one example of the embodiment;

Part (a) of FIG. 17 is a diagram illustrating the process-related weight information that is yet to be corrected in the storage system serving as the one example of the embodiment, and part (b) of FIG. 17 is a diagram illustrating the process-related weight information that has been corrected in the storage system serving as the one example of the embodiment;

Part (a) of FIG. 18 is a diagram illustrating the degree of similarity calculated before the correction is made in the storage system serving as the one example of the embodiment, and part (b) of FIG. 18 is a diagram illustrating the degree of similarity calculated after the correction is made in the storage system serving as the one example of the embodiment;

FIG. 19 is a flowchart illustrating processing for correcting an inter-process weight in the storage system serving as the one example of the embodiment;

FIG. 20 is a flowchart illustrating processing for correcting the inter-user weight and the inter-process weight in the storage system serving as the one example of the embodiment;

FIGS. 21A and 21B are a diagram illustrating an overview of the processing for correcting the inter-user weight and the inter-process weight in the storage system serving as the one example of the embodiment;

FIG. 22 is a diagram illustrating processing for controlling writing performed in the storage system serving as the one example of the embodiment; and Part (a) of FIG. 23 is a diagram illustrating the degrees of similarity calculated before a correction is made in the storage system serving as the one example of the embodiment, part (b) of FIG. 23 is a diagram illustrating the degrees of similarity to an object newly generated in the storage system serving as the one example of the embodiment, and part (c) of FIG. 23 is a diagram illustrating the degrees of similarly calculated after the correction is made in the storage system serving as the one example of the embodiment.

DESCRIPTION OF EMBODIMENTS

When a desired object is read from a sequential access medium in the system described above, the time taken for locating the object on the sequential access medium (also referred to as location) increases. As a result, it takes long to read (load) the object.

In one aspect, the time taken for reading an object from a sequential access medium may be reduced.

An embodiment of the present disclosure will be described below with reference to the drawings. Note that the embodiment described below is merely an example and does not intend to exclude various modifications and applications of technology that are not explicitly described below. For example, the embodiment may be carried out by variously modifying the embodiment within a scope not departing from the gist of the embodiment. Components assigned the same reference sign in the drawings used in the following embodiment represent identical or similar components unless otherwise noted.

Figure 1:
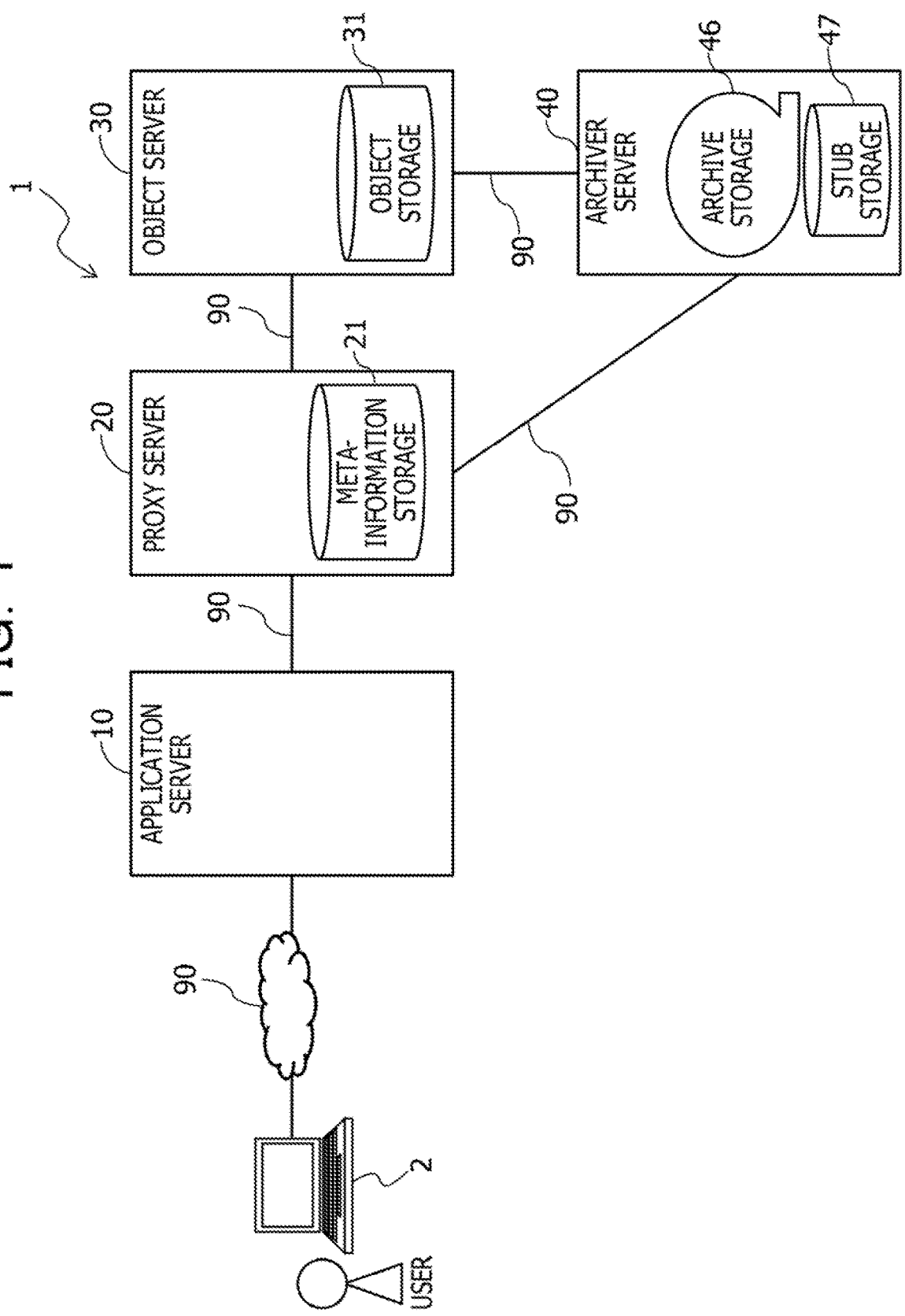
FIG. 1 is a diagram illustrating a hardware configuration of a storage system serving as one example of an embodiment.

1 One Embodiment 1-1 Example of Hardware Configuration of Storage System according to One Embodiment FIG. 1 is a diagram illustrating a hardware configuration of a storage system 1 serving as one example of an embodiment.

As illustrated in FIG. 1, the storage system 1 includes an application server 10, a proxy server 20, an object server 30, and an archiver server 40. The application server 10 is coupled to a user terminal 2 and the proxy server 20 via a network 90 such as the Internet.

The proxy server 20 is coupled to the application server 0 the object server 30, and the archiver server 40 via the network 90.

The application server 10 is a computer that provides a user who uses the user terminal 2 with an application for reading (acquiring) an object, writing an object, or the like.

For example, it is assumed that the user issues a request for reading or writing data in units of objects by using, for example, a certain application in the application server 10 via the user terminal 2. Writing of an object is also referred to as registration of an object, migration of an object, or movement of an object.

The application server 10 monitors, for example, a process (program) that is executed in response to a request made by a user. The application server 10 adds, as meta-information (metadata) 25 described later (see FIG. 9 or the like), the monitoring result (for example, information about the process) to an object serving as the target of the request made by the user. The application server 10 transmits the resultant object to the proxy server 20 together with the request (write or read request) made by the user. The object to which the meta-information 25 is added is also referred to as event information.

The proxy server 20 is a computer that has a proxy function and a gateway function and that transmits (transfers) a request made by a user received from the application server 10 to the object server 30 and the archiver server 40. The proxy server 20 is the computer that also receives a result corresponding to the request from the object server 30 and the archiver server 40, and transmits the result to the user.

The proxy server 20 receives an object to which the meta-information 25 has been added, from the application server 10 together with a request made by a user. The proxy server 20 updates, by using the received meta-information 25, the meta-information 25 of the object stored in a meta-information storage 21 (described later) included in the proxy server 20.

Upon receiving a request for reading an object made by a user from the application server 10, the proxy server 20 transmits the read request to the object server 30 and the archiver server 40. The proxy server 20 transmits the object that is a target of reading and is acquired from the object server 30 or the archiver server 40 in response to the read request, to the user terminal 2 via the application server 10.

Upon receiving a request for writing an object made by a user from the application server 10, the proxy server 20 extracts the meta-information 25 of interest from the meta-information 25 of the object stored in the meta-information storage 21 (described later). The proxy server 20 adds the extracted meta-information 25 to the object, and transmits the resultant object to the object server 30, The proxy server 20 provides the meta-information 25 stored in the meta-information storage 21 to the archiver server 40.

The storage system 1 according to the present embodiment includes the application server 10 and the proxy server 20; however, the hardware configuration of the storage system 1 is not limited thereto. For example, the application server 10 may have functions of the proxy server 20.

The object server 30 is a computer that stores an object in an object storage 31 (described later) included therein. It is assumed in the present embodiment that the object storage 31 stores a frequently used object.

Upon receiving a request for reading an object made by a user from the proxy server 20, the object server 30 determines whether or not the object that is the target of the read request is stored in the object storage 31 (described later). If the object server 30 determines that the object is stored in the object storage 31 (described later), the object server 30 reads the object from the object storage 31 (described later) and transmits the read object to the user terminal 2 via the proxy server 20. If the object server 30 determines that the object is not stored in the object storage 31 (described later), the object server 30 transmits (transfers) the read request to the user terminal 2.

Upon receiving a request for writing an object made by a user and an object that is a target of the write request from the proxy server 20, the object server 30 transmits (transfers) the write request to the archiver server 40.

The archiver server 40 is a computer that controls writing and reading of an object in and from an archive storage 46 (described later) and a stub storage 47 (described later) that are included therein. In the present embodiment, an entity that performs processing for writing (storing) an object in the archive storage 46 is referred to as an archiver or archiver server.

For example, upon receiving a request for writing an object made by a user from the proxy server 20 or the object server 30, the archiver server 40 writes the object that is the target of the request in the archive storage 46 (described later) or the stub storage 47 (described later). At that time, the archiver server 40 calculates, based on the meta-information 25, a degree of similarity between the object that is the target of the write request and each object stored in the archive storage 46 (described later).

The archiver server 40 writes the object after determining a write destination archive and a writing order to the archive storage 46 based on the calculated degrees of similarity. A method for calculating the similarity, a method for determining the write destination archive, and a method for determining the writing order will be described later.

Upon receiving a request for reading an object made by a user from the proxy server 20, the archiver server 40 reads the object that is the target of the request from the archive storage 46 (described later) or the stub storage 47 (described later). The archiver server 40 transmits the read object to the user terminal 2 via the proxy server 20.

FIG. 1 illustrates a configuration in which the storage system 1 includes a single proxy server 20, a single object server 30, and a single archiver server 40, and in which each of the proxy server 20, the object server 30, and the archiver server 40 includes a single storage device; however, the configuration is not limited thereto.

FIG. 1 also illustrates a configuration in which there is a single user and the storage system 1 includes a single user terminal 2; however, there may be a plurality of users. In such a case, the storage system 1 may include a plurality of user terminals 2.

Each of the proxy server 20, the object server 30, and the archiver server 40 may be coupled to, for example, an administrator terminal (not illustrated) used by an administrator via a network (not illustrated).

Figure 2:
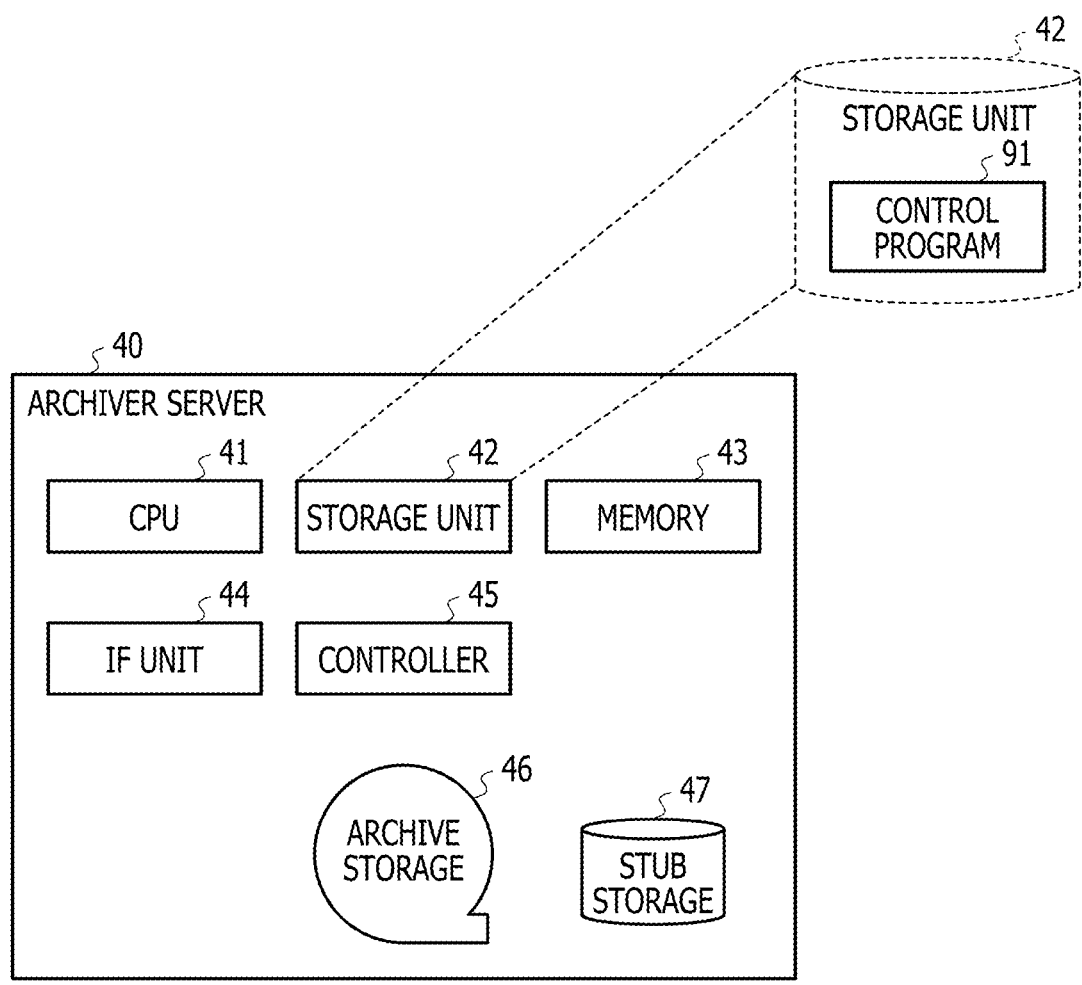
FIG. 2 is a diagram illustrating a hardware configuration of each server included in the storage system serving as the one example of the embodiment.

1-2 Example of Hardware Configuration of Archiver Server in Storage System according to One Embodiment FIG. 2 is a diagram illustrating a hardware configuration of the archiver server 40 included in the storage system 1 serving as the one example of the embodiment.

The hardware configuration of the archiver server 40 will be described with reference to FIG. 2.

The archiver server 40 may include a central processing unit (CPU) 41, a storage unit 42, a memory 43, an interface (IF) unit 44, a controller 45, the archive storage 46, and the stub storage 47.

The CPU 41 executes an operating system (OS) and a program stored in the storage unit 42 (described later). In response to a request input from the user terminal 2, the CPU 41 controls reading of information from or writing of information in a sequential access medium via the controller 45 (described later). In the present embodiment, the CPU 41 executes a control program 91 (see FIG. 2).

The storage unit 42 is an example of hardware that stores various kinds of data, programs, and so on. For example, the storage unit 42 may be used as a secondary storage device of the archiver server 40 and may store programs such as the OS, firmware, and applications and various kinds of data. Examples of the storage unit 42 include, for example, a magnetic disk device such as a hard disk drive (HDD), a solid state drive (SSD), and storage class memories (SCMs). The storage unit 42 may store a program (the control program 91) for implementing all or some of various functions of the archiver server 40.

The memory 43 is an example of hardware that stores various kinds of data, programs, and so on. Examples of the memory 43 include a volatile memory such as a random-access memory (MM) and a nonvolatile memory such as a flash memory, SCMs, or a read-only memory (ROM).

The IF unit 44 is an example of a communication interface that controls coupling and communication to the proxy server 20 and the object server 30 via the network 90. Examples of the IF unit 44 include an adaptor conforming to Ethernet (registered trademark), optical communication (Fibre Channel, for example), or the like. The archiver server 40 may include a communication interface that controls coupling and communication to an administrator terminal (not illustrated) used by an administrator, and may download the control program 91 by using the communication interface.

The controller 45 controls and manages the archive storage 46 (described later).

The archive storage 46 is a sequential access medium that stores (saves) an object. It is assumed in the present embodiment that the archive storage 46 includes a magnetic tape (hereinafter referred to as a sequential access medium or a storage medium) and stores an object for the purpose of permanent storage. Since a specific method for storing an object is known, a description thereof is omitted.

The stub storage 47 has a function of a cache that temporarily stores an object copied (moved) from the object server 30, for example. The stub storage 47 may be an HDD or an SSD, and may be a mixture of various storage devices.

FIG. 2 illustrates the case where the archiver server 40 includes a single archive storage 46 and a single stub storage 47; however, the configuration is not limited thereto.

Although not illustrated, for example, the archiver server 40 may include an input unit such as a mouse or a keyboard, and may include a display unit including an output device such as a display or a printer.

The hardware configurations of the application server 10, the proxy server 20, and the object server 30 according to the present embodiment are substantially the same as that of the archiver server 40 except for the storage devices (the archive storage 46 and the stub storage 47). Therefore, illustration of the duplicated portion is omitted. A storage device included in each of the application server 10, the proxy server 20, and the object server 30 will be described below with reference to FIG. 1.

It is assumed that the proxy server 20 according to the present embodiment includes the meta-information storage 21 as the storage device. The meta-information storage 21 stores the meta-information 25 (described later). For example, the meta-information storage 21 may be constituted by a storage device such as a database, or by an HDD or an SSD.

It is assumed that the object server 30 according to the present embodiment includes the object storage 31 as the storage device. The object storage 31 may be constituted by a storage device that stores an object, and may be an HDD or an SSD, for example.

Figure 3:
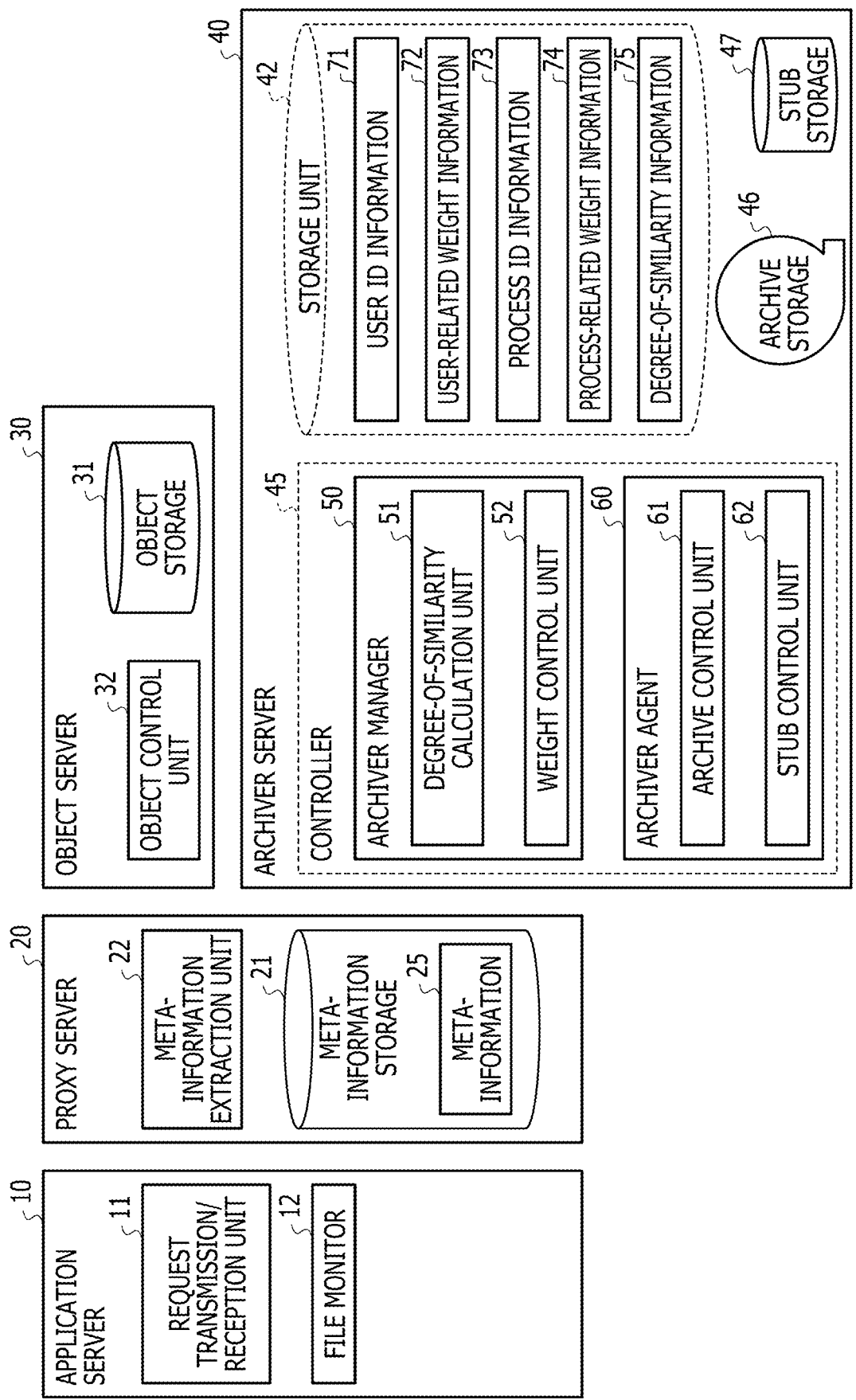
FIG. 3 is a diagram illustrating a functional configuration of each server included in the storage system serving as the one example of the embodiment.

1-3 Example of Functional Configuration of Each Server in Storage System according to One Embodiment FIG. 3 is a diagram illustrating a functional configuration of each server included in the storage system 1 serving as the one example of the embodiment illustrated in FIG. 1.

The functional configuration of the archiver server 40 will be described first with reference to FIG. 3.

As illustrated in FIG. 3, the archiver server 40 may include an archiver manager 50 and an archiver agent 60 by way of example. The storage unit 42 of the archiver server 40 may store user identifier (ID) information 71, user-related weight information 72, process ID information 73, process-related weight information 74, and degree-of-similarity information 75.

The archiver manager 50 may include a degree-of-similarity calculation unit 51 and a weight control unit 52.

The archiver manager 50 and the archiver agent 60 may be implemented by the controller 45.

Upon receiving a request for writing an object made by a user from the proxy server 20 or the object server 30, the degree-of-similarity calculation unit 51 of the archiver manager 50 calculates a degree of similarity for the object based on the meta-information 25. A specific method for calculating the degree of similarity will be described later.

The degree-of-similarity calculation unit 51 determines a write destination archive based on the calculated degree of similarity. At that time, in the present embodiment, the write destination archive is determined so that objects determined to be similar to each other are successfully stored in the same archive. In the present embodiment, the archive refers to a storage area of a sequential access medium (the archive storage 46), in which one or more objects are sequentially written.

For example, the degree of similarity between objects may change at the time of writing a new object, and it may be desirable to store an already written object in another archive. Therefore, the degree-of-similarity calculation unit 51 determines the write destination archive of each object based on the calculated degree of similarity. The degree-of-similarity calculation unit 51 notifies an archive control unit 61 (described later) of the archiver agent 60 of the write destination archive for each object.

The degree-of-similarity calculation unit 51 determines the writing order to the archive storage 46 based on the calculated degree of similarity. It is assumed in the present embodiment that when there are a plurality of archives in the archive storage 46, the degree-of-similarity calculation unit 51 determines the writing order for each of the archives.

In the present embodiment, the degree-of-similarity calculation unit 51 determines the order (writing order) such that objects having a greater degree of similarity are written at closer locations. This is because when a user reads a plurality of written objects, the user often requests to read objects having a greater (higher) relation (correlation) sequentially. Therefore, objects having a greater relation are written (disposed) at neighboring locations on the sequential access medium (the archive storage 46), for example. This successfully reduces the time taken for locating an object on the sequential access medium (the archive storage 46) when reading the object and reduces the time taken for reading the object. The degree-of-similarity calculation unit 51 notifies the archive control unit 61 (described later) of the archiver agent 60 of the write destination archive for each object.

The degree-of-similarity calculation unit 51 transmits a list of objects serving as targets of the write request to the archive control unit 61 (described later).

The weight control unit 52 of the archiver manager 50 corrects (updates) a user-related weight and a process-related weight respectively stored in the user-related weight information 72 (described later) and the process-related weight information 74 (described later) in the storage unit 42. It is assumed that every time monitoring information is acquired by a file monitor 12 (described later) of the application server 10, the weight control unit 52 in the present embodiment corrects the user-related weight information 72 (described later) and the process-related weight information 74 (described later) based on the acquired monitoring information. A specific method for correcting these weights will be described later.

The archiver agent 60 may include the archive control unit 61 and a stub control unit 62.

The archive control unit 61 of the archiver agent 60 controls writing and reading in and from the archive storage 46.

For example, the archive control unit 61 transmits a move call command to the object server 30, based on a list of objects that are targets of a write request and that the archive control unit 61 is notified of by the degree-of-similarity calculation unit 51. Since such a command is known, a description thereof is omitted herein.

The archive control unit 61 writes objects stored in the stub storage 47 to the archive storage 46 in accordance with the writing order determined by the degree-of-similarity calculation unit 51.

When an object that is a target of a read request made by a user is not stored in the stub storage 47, the archive control unit 61 reads from the archive storage 46 the object to be read. The archive control unit 61 transmits the read object to the proxy server 20.

The stub control unit 62 of the archiver agent 60 controls writing and reading of an object in and from the stub storage 47.

For example, upon receiving an object that is a target of a write request from the object server 30, the stub control unit 62 stores (copies) the received object in the stub storage 47. Thereafter, the archive control unit 61 writes the object stored in the stub storage 47 to the archive storage 46.

Upon receiving a request for reading an object made by a user from the proxy server 20, the stub control unit 62 determines whether or not the object to be read is stored in the stub storage 47 (whether or not the object is an instance). If the object to be read is stored in the stub storage 47, the stub control unit 62 reads the object from the stub storage 47 and transmits the read object to the proxy server 20. If the object to be read is not stored in the stub storage 47, the archive control unit 61 reads the object from the archive storage 46 and transmits the read object to the proxy server 20.

The user ID information 71 and the user-related weight information 72 that are stored in the storage unit 42 will be described next.

The user ID information 71 will be described first with reference to FIG. 4.

FIG. 4 is a diagram illustrating the user ID information 71 used in the storage system 1 illustrated in FIG. 3. In the present embodiment, the user ID information 71 is expressed in the form of a table as illustrated in FIG. 4;

however, the expression form of the information stored in the user ID information 71 is not limited to the table and may be variously modified.

The user ID information 71 illustrated in FIG. 4 includes a "user ID" field and a "user name" field.

The "user ID" field of the user ID information 71 stores an ID for uniquely identifying a user. It is assumed in the present embodiment that a value stored in the "user ID" field is given by the administrator.

The "user name" field of the user ID information 71 stores the name of the user identified by the value stored in the "user ID" field. It is assumed in the present embodiment that a value stored in the "user name" field is given by the administrator.

FIG. 4 indicates that, for example, the user name of the user having the user ID of "10" is "yoshida".

The user-related weight information 72 will be described next with reference to FIG. 5.

FIG. 5 is a diagram illustrating the user-related weight information 72 used in the storage system 1 illustrated in FIG. 3.

The user-related weight information 72 illustrated in FIG. 5 includes "user ID" fields, and a matrix is constituted by user IDs. The value stored in the "user ID" field of the user-related weight information 72 corresponds to the value stored in the "user ID" field of the user ID information 71. In the present embodiment, the user-related weight information 72 is expressed in the form of a matrix as illustrated in FIG. 5; however, the expression form of the information stored in the user-related weight information 72 is not limited to the matrix and may be variously modified.

The user-related weight information 72 illustrated in FIG. 5 stores a relation between users as a weight represented by a value of 0 or greater. The closer the value approaches "0", the less (weaker) the relation between the users is. The value stored in the user-related weight information 72 is also referred to as an inter-user weight.

FIG. 5 indicates that a weight (relation) between the user ("yoshida") having the "user ID" of "10" and the user ("saitou") having the "user ID" of "20" is "0.8", for example. FIG. 5 also indicates that the weight between the user ("yoshida") having the "user ID" of "10" and the user ("kobayashi") having the "user ID" of "30" is "0.9", for example. The foregoing indicates that the user "yoshida" has a greater (stronger) relation to the user "kobayashi" than to the user "saitou".

The process ID information 73 and the process-related weight information 74 that are stored in the storage unit 42 will be described next.

The process ID information 73 will be described first with reference to FIG. 6.

FIG. 6 is a diagram illustrating the process ID information 73 used in the storage system 1 illustrated in FIG. 3. In the present embodiment, the process ID information 73 is expressed in the form of a table as illustrated in FIG. 6; however, the expression form of the information stored in the process ID information 73 is not limited to the table and may be variously modified.

The process ID information 73 illustrated in FIG. 6 includes a "process ID" field and a "process name" field.

The "process ID" field of the process ID information 73 stores an ID for uniquely identifying a process. It is assumed in the present embodiment that a value stored in the "process ID" field is given by the administrator.

The "process name" field of the process ID information 73 stores the name of the process identified by the value stored in the "process ID" field. It is assumed in the present embodiment that a value stored in the "process ID" field is given by the administrator.

FIG. 6 indicates that the process name of the process having the process ID of "50" is "sparc".

The process-related weight information 74 will be described next with reference to FIG. 7.

FIG. 7 is a diagram illustrating the process-related weight information 74 used in the storage system 1 illustrated in FIG. 3

The process-related weight information 74 illustrated in FIG. 7 includes "process ID" fields, and a matrix is constituted by process IDs. The value stored in the "process ID" field of the process-related weight information 74 corresponds to the value stored in the "process ID" field of the process ID information 73. In the present embodiment, the process-related weight information 74 is expressed in the form of a matrix as illustrated in FIG. 7; however, the expression form of the information stored in the process-related weight information 74 is not limited to the matrix and may be variously modified.

The process-related weight information 74 illustrated in FIG. 7 stores a relation between processes as a weight represented by a value of 0 or greater. The closer the value approaches "0", the less the relation between the processes is. The value stored in the process-related weight information 74 is also referred to as an inter-process weight.

FIG. 7 indicates that a weight (relation) between the process ("sparc") having the "process ID" of "50" and the process ("kibana") having the process ID of "60" is "0.2", for example. FIG. 7 also indicates that a weight between the process ("sparc") having the "process ID" of "50" and the process ("logstash") having the "process ID" of "70" is "1.0". The foregoing indicates that the process "sparc" has a greater relation to the process "logstash" than to the process "kibana".

The degree-of-similarity information 75 stored in the storage unit 42 will be described next with reference to FIG. 8

The degree-of-similarity information 75 illustrated in FIG. 8 includes "object ID" fields, and a matrix is constituted by "object IDs". The value stored in the "object ID" field of the degree-of-similarity information 75 is an ID for uniquely identifying an object. In the present embodiment, the degree-of-similarity information 75 is expressed in the form of a matrix as illustrated in FIG. 8; however, the expression form of the information stored in the degree-of-similarity information 75 is not limited to the matrix and may be variously modified.

FIG. 8 indicates that the degree of similarity between the object having the "object. ID" of "OBJ.10$v$" and the object having the "object ID" of "OBJ.20$v$" is "0.759", for example. This degree of similarity will be described later.

Returning to the description of the functional configuration illustrated in FIG. 3, the functional configuration of the application server 10 will be described next.

As illustrated in FIG. 3, the application server 10 may include a request transmission/reception unit 11 and the file monitor 12 by way of example.

The request transmission/reception unit 11 receives a request for reading an object or a request for writing an object from a user. The request transmission/reception unit 11 adds the meta-information 25 acquired by the file monitor 12 (described later) to an object that is the target of the request. The request transmission/reception unit 11 transmits the request received from the user and the object to which the meta-information 25 has been added to the proxy server 20.

Every time the request transmission/reception unit 11 receives a request from a user, the request transmission/reception unit 11 may transmit the request and an object to which the meta-information 25 has been added to the proxy server 20. Upon receiving a request for acquiring the meta-information 25 from the archiver server 40 via the proxy server 20, the request transmission/reception unit 11 may transmit the meta-information 25 to the archiver server 40 via the proxy server 20 in response to the acquisition request.

The file monitor 12 monitors a process that utilizes (uses) an object. The file monitor 12 provides the request transmission/reception unit 11 with the monitoring result (the process name used) for the object that is the target of a request made by a user and is received by the request transmission/reception unit 11.

The functional configuration of the proxy server 20 will be described next with reference to FIG. 3.

As illustrated in FIG. 3, the proxy server 20 may include a meta-information extraction unit 22 by way of example.

The meta-information extraction unit 22 receives a request made by a user and an object to which the meta-information 25 has been added from the application server 10, and updates the meta-information 25 of the object stored in the meta-information storage 21 by using the meta-information 25.

Upon receiving a request for writing an object made by a user from the application server 10, the meta-information extraction unit 22 extracts, from the meta-information storage 21, the meta-information 25 of interest regarding the object that is the target of the write request. The meta-information extraction unit 22 adds the extracted meta-information 25 to the object, and transmits the resultant object to the object server 30 together with the request made by the user.

Upon receiving a request for reading an object made by a user from the application server 10, the meta-information extraction unit 22 transmits (transfers) the read request to the object server 30 and the archiver server 40. The meta-information extraction unit 22 transmits an object that is the target of reading and is acquired from the object server 30 or the archiver server 40 in response to the read request, to the user terminal 2 via the application server 10.

The meta-information extraction unit 22 provides the archiver server 40 with the meta-information 25 stored in the meta-information storage 21.

The meta-information 25 stored in the meta-information storage 21 will be described next with reference to FIG. 9.

FIG. 9 is a diagram illustrating the meta-information 25 stored in the meta-information storage 21 illustrated in FIG. 3. In the present embodiment, the meta-information 25 is expressed in the form of a table as illustrated in FIG. 9; however, the expression form of the information stored as the meta-information 25 is not limited to the table and may be variously modified.

FIG. 9 illustrates the meta-information 25 regarding three objects ("OBJ1" to "OBJ3"). The meta-information 25 illustrated in FIG. 9 includes an "object name" field, an "object ID" field, a "write frequency" field, a "read frequency" field, a "generation time" field, a "user ID" field, a "process ID" field, and an "event ID" field. Various kinds of information included in the meta-information 25 are also referred to as vector elements.

The "object name" field of the meta-information 25 stores the name of each of objects ("OBJ1" to "OBJ3" in the example illustrated in FIG. 9), In the present embodiment, for example, "OBJi" (where i is an integer greater than 0) indicates the name (object name) of an object identified by an object ID "OBJ.iv" (described later).

The "object ID" field of the meta-information 25 stores an ID (any of "OBJ.1v" to "OBJ.3v" in the example illustrated in FIG. 9) for uniquely identifying an object. In the present embodiment, for example, "OBJ.iv" (where i is an integer greater than 0) represents the object ID of the object. OBJi.

A value stored in the "object ID" field may be given by, for example, the administrator or the storage system 1.

The "write frequency" field of the meta-information 25 stores the write frequency with which (the number of times) the object identified by the object ID in the "object ID" field has been written. In the present embodiment, it is assumed that the "write frequency" field stores an integer of 0 or greater.

It is assumed that the meta-information extraction unit 22 of the proxy server 20 updates the value stored in the "write frequency" field, based on a write request made by the user which the meta-information extraction unit 22 receives from the application server 10. For example, if a request made by the user and received by the meta-information extraction unit 22 is a write request, the meta-information extraction unit 22 increments the value stored in the "write frequency" field and stores the incremented value in the "write frequency" field.

FIG. 9 indicates that the "write frequency" of the object having the "object ID" of "OBJ1v" is "69" times.

The "read frequency" field of the meta-information 25 stores the read frequency with which (the number of times) the object identified by the object ID in the "object ID" field has been read. In the present embodiment, it is assumed that the "read frequency" field stores an integer of 0 or greater.

It is assumed that the meta-information extraction unit 22 of the proxy server 20 updates the value stored in the "read frequency" field based on a read request made by a user which the meta-information extraction unit 22 receives from the application server 10. For example, if a request made by the user and received by the meta-information extraction unit 22 is a read request, the meta-information extraction unit 22 increments the value stored in the "read frequency" field and stores the incremented value in the "read frequency" field.

FIG. 9 indicates that the "read frequency" of he object having the "object ID" of "OBJ.1v" is "41" times.

The "generation time" field of the meta-information 25 stores the generation time of an object identified by an object ID stored in the "object ID" field. In the present embodiment, it is assumed that the generation time is stored together with the generation time in the decimal notation.

FIG. 9 indicates that the "generation time" of the object having the "object ID" of "OBJ.1v" is "10:20" (ten twenty) and that this generation time expressed in the decimal notation is "0.430556".

The "user ID" field of the meta-information 25 stores an ID of a user who has made a read request or a write request for the object identified by the object ID stored in the "object ID" field. When there are a plurality of users who have requested reading or writing, user IDs of these users are linked together by using "," and are stored.

FIG. 9 indicates that the "user IDs" of the users who have requested reading or writing of the object having the "object ID" of "OBJ.1v" are "10" and "0".

The "process ID" field of the meta-information 25 stores an ID of a process that is executed in response to a request made by a user when the user makes the request for reading or writing the object identified by the object ID stored in the "object ID" field. When there are a plurality of processes that are executed, process IDs of these processes are linked together by using "," and are stored.

FIG. 9 indicates that the "process IDs" of the processes that are executed in response to a request made by a user when the user makes the request for reading or writing the object having the "object ID" of "OBJ.1v" are "50" and "0".

The "event ID" field of the meta-information 25 stores an ID of an event that occurs in response to a request made by a user when the user makes the request for reading or writing the object identified by the object ID stored in the "object ID" field.

FIG. 9 indicates that the "event ID" of the event that occurs in response to a request made by a user when the user makes the request for reading or writing the object having the "object ID" of "OBJ.1v" is "2".

Returning to the description of the functional configuration illustrated in FIG. 3, the functional configuration of the object server 30 will be described next.

As illustrated in FIG. 3, the object server 30 may include an object control unit 32 by way of example.

Upon receiving a request for writing an object made by a user and the object that is the target of the write request from the proxy server 20, the object control unit 32 transmits (transfers) the write request to the archiver server 40.

Upon receiving a request for reading an object made by a user from the proxy server 20, the object control unit 32 determines whether or not the object that is the target of the read request is stored in the object storage 31. When determining that the object is stored in the object storage 31 of the object server 30, the object control unit 32 reads the object from the object storage 31 and transmits the read object to the user terminal 2 via the proxy server 20. When determining that the object is not stored in the object storage 31 of the object server 30, the object control unit 32 transmits (transfers) the read request to the archiver server 40.

1-4 Processing for Calculating Degree of Similarity in Storage System according to One Embodiment As an example of the embodiment configured as described above, processing for calculating a degree of similarity performed by the degree-of-similarity calculation unit 51 in the storage system 1 will be described with reference to FIGS. 10 to 12.

Figure 10:
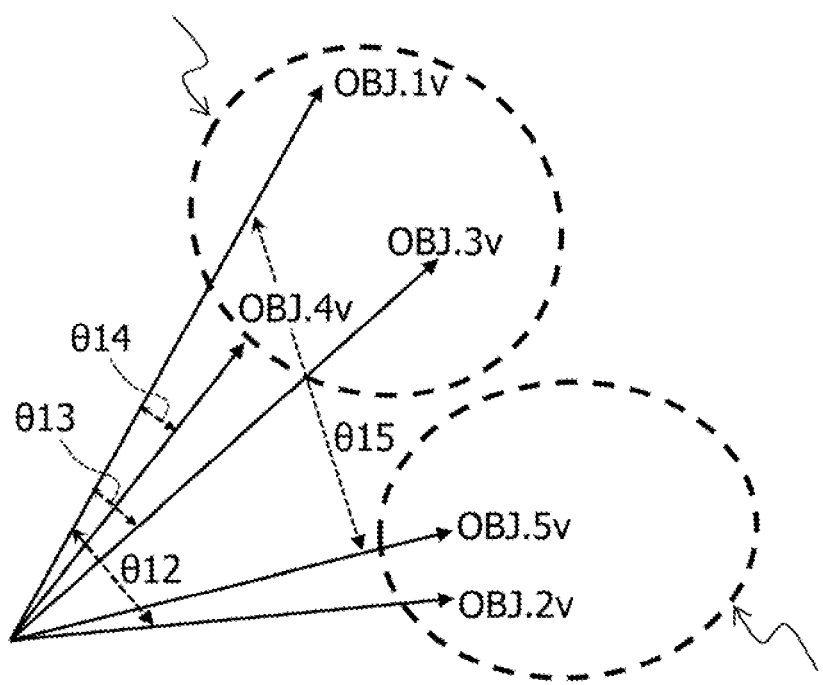
FIG. 10 is a diagram conceptually describing the similarities between objects in the storage system serving as the one example of the embodiment.

FIG. 10 is a diagram conceptually describing processing for determining the similarities between objects in the storage system 1 according to the one embodiment.

Figure 11:
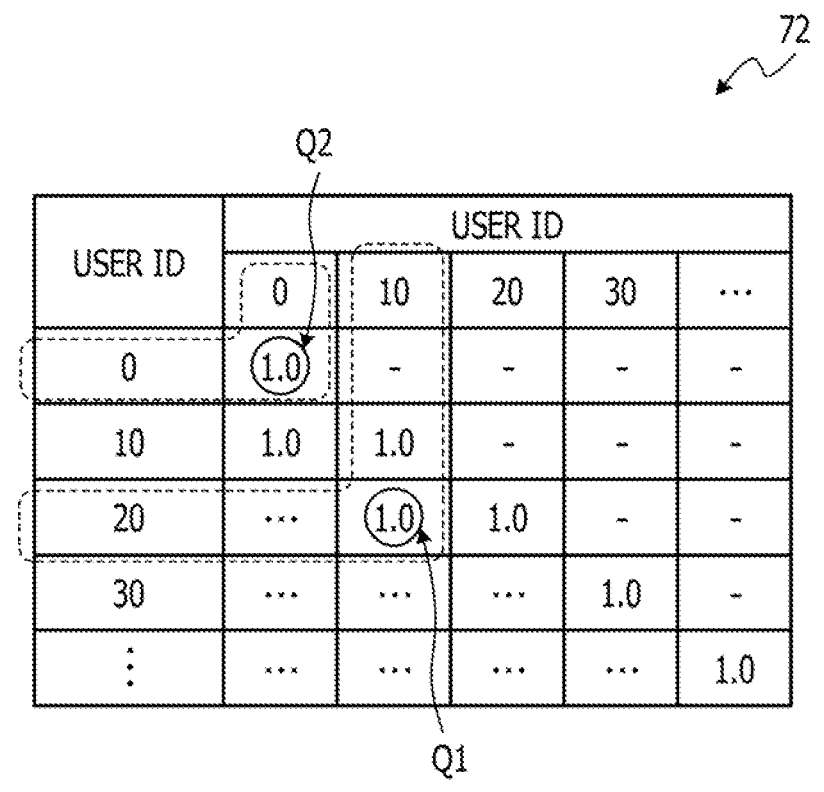

FIG. 11 is a diagram illustrating the user-related weight information 72 used in the storage system 1 according to the one embodiment.

Figure 12:
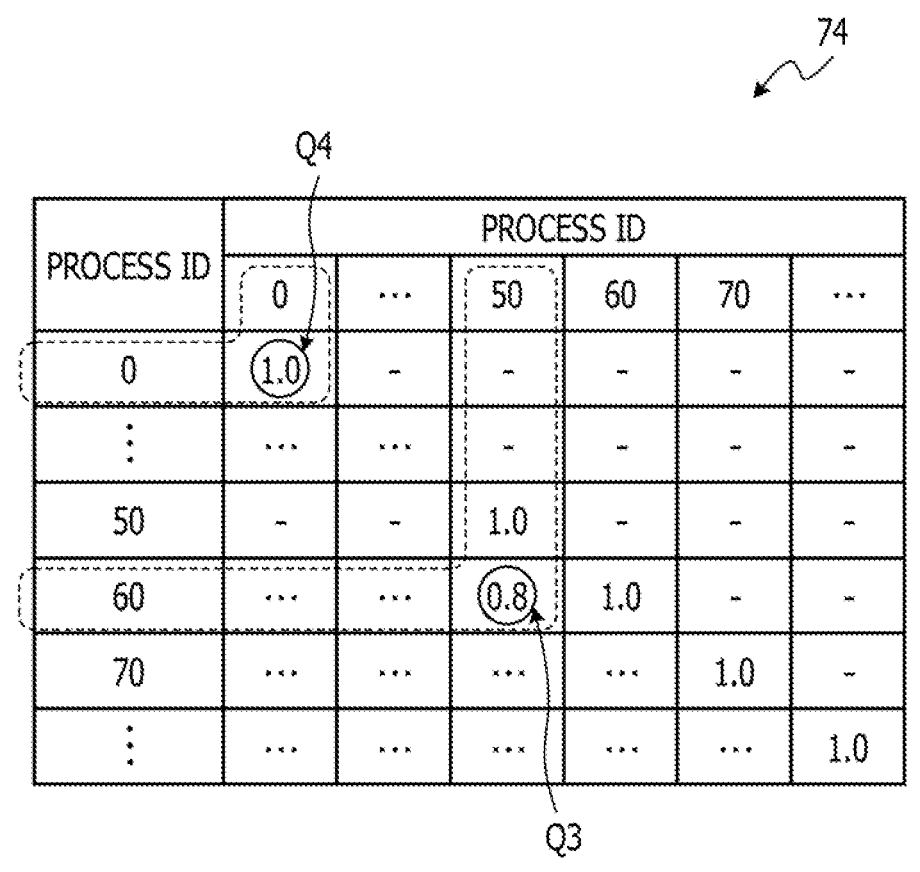

FIG. 12 is a diagram illustrating the process-related weight information 74 used in the storage system 1 according to the one embodiment.

In the present embodiment, objects are first represented by multidimensional vectors in order to determine the similarities between the objects. It is assumed that each of these vectors is represented by using the meta-information 25 (the "write frequency", the "read frequency", the "generation time", the "user ID", the "process ID", and the "event ID") illustrated in FIG. 9.

In the present embodiment, the degree of similarity (resemblance) between two vectorized objects is calculated by using calculation formula (1) below, and the calculated degree of similarity is used as the degree of similarity between these objects. The calculation formula (1) exemplifies the case where the degree of similarity between objects OBJn and OBJm is calculated (where n and m are integers of 0 or greater).

$$\text{Degree of similarity}(OBJn, OBJm) = \cos\theta \quad (1)$$

In the present embodiment, if the value of the degree of similarity calculated by using the calculation formula (1) is equal to or greater than a certain threshold (for example, 0.8), it is determined that the objects have a similarity (are similar). If the value of the degree of similarity calculated by using the calculation formula (1) is less than the certain threshold (for example, 0.8), it is determined that the objects do not have a similarity (are not similar).

In the present embodiment, it is determined the greater the value of the degree of similarity calculated by using the calculation formula (1), the greater the similarity between the objects (the more similar the objects are). Conversely, the smaller the value of the degree of similarity calculated by using the calculation formula (1), the smaller the similarity between the objects (the less similar the objects are).

FIG. 10 illustrates five objects (OBJ1 to OBJ5) that are represented by multidimensional vectors (OBJ1v to OBJ5v) (vectorized objects). A case where it is determined whether or not the object OBJ1 is similar to the other objects will be described with reference to the example illustrated in FIG. 10 by way of example.

In the example illustrated in FIG. 10, suppose that a degree of similarity ($\theta15$) between the objects OBJ1 and OBJ5 is calculated to be 0.2 (which is less than 0.8) and a degree of similarity ($\theta13$) between the objects OBJ1 and OBJ3 is calculated to be 0.9 (which is greater than or equal to 0.8) based on the calculation formula (1). In this case, the degree-of-similarity calculation unit 51 determines that the objects OBJ1 is similar to the object OBJ3 but the object OBJ1 is not similar to the object OBJ5.

In the example illustrated in FIG. 10, suppose that a degree of similarity ($\theta14$) between the objects OBJ1 and OBJ4 is calculated to be 0.8 (which is greater than or equal to 0.8) based on the calculation formula (1). In this case, the degree-of-similarity calculation unit 51 determines that the object OBJ1 is more similar to the object OBJ3 than to the object OBJ4.

The foregoing indicates that, when a group of objects for which the value of the degree of similarity to the object OBJ1 calculated by using the calculation formula (1) is 0.8 or greater is set as an archive group 1 as illustrated in FIG. 10, the group includes objects similar to the object OBJ1. Therefore, the archive group 1 includes, for example, the objects OBJ3 and OBJ4.

When a group of objects for which the value of the degree of similarity to the object OBJ1 calculated by using the calculation formula (1) is less than 0.8 is set as an archive group 2, the group includes objects that are not similar to the object OBJ1. Therefore, the archive group 2 includes, for example, the objects OBJ2 and OBJ5.

A specific calculation method (calculation method for determining $\cos\theta$) based on the calculation formula (1) will be described by using FIGS. 11 and 12 with reference to FIG. 9.

FIG. 11 is a diagram illustrating the user-related weight information 72 of users of the three objects ("OBJ1" to "OBJ3") illustrated in FIG. 9.

FIG. 12 is a diagram illustrating the process-related weight information 74 of processes relating to the three objects ("OBJ1" to "OBJ3") illustrated in FIG. 9.

In the present embodiment, cos θ of the calculation formula (1) is determined by using calculation formula (2). For example, the calculation formula (2) exemplifies a calculation of the degree of similarity between the objects OBJn and OBJm (where n and m are integers of 0 or greater).

$$\cos\theta = \frac{\overrightarrow{OBJ.nv} \cdot \overrightarrow{OBJ.mv} \cdot \overrightarrow{Weight}}{|\overrightarrow{OBJ.nv}| \cdot |\overrightarrow{OBJ.mv}|} \quad (2)$$

As indicated by the calculation formula (2) for example, the degree of similarity (cos θ) in the present embodiment is calculated in consideration of the user-related weight information 72 illustrated in FIG. 11 and the process-related weight information 74 illustrated in FIG. 12. For example, in the present embodiment, the degree of similarity is calculated in consideration of the weights concerning the user ID and the process ID of the meta-information 25. That is, in the present embodiment, the meta-information 25 other than the user ID and the process ID (the write frequency, the read frequency, the generation time, and the event ID) is not taken into consideration. Therefore, it is assumed that the degree of similarity is calculated by setting weights for all of these parameters to "1".

The case where the degree of similarity between the objects OBJ1 and OBJ2 is determined by using the calculation formula (2) will be described by way of example. In this case, the numerator of the calculation formula (2) is equal to the sum of values determined by using calculation formulas (2-1) to (2-8) below.

(Weight of "write frequency")*(Value of "write frequency" of OBJ1)*(Value of "write frequency" of OBJ2)     (2-1)

(Weight of "read frequency")*(Value of "read frequency" of OBJ1)*(Value of "read frequency" of OBJ2)     (2-2)

(Weight of "generation time")*(Value of "generation time" of OBJ1)*(Value of "generation time" of OBJ2)     (2-3)

(Inter-user weight between user (user ID "10") who has used OBJ1 and user (user ID "20") who has used OBJ2)*(Value of user ID of user (user ID "10") who has used OBJ1)*(Value of user ID of user (user ID "20") who has used OBJ2)     (2-4)

(Inter-user weight between user (user ID "0") who has used OBJ1 and user (user ID "0") who has used OBJ2)*(Value of user ID of user (user ID "0") who has used OBJ1)*(Value of user ID of user (user ID "0") who has used OBJ2)     (2-5)

(Inter-process weight between process (process ID "50") relating to OBJ1 and process (process ID "60") relating to OBJ2)*(Value of process ID of process (process ID "50") relating to OBJ1)*(Value of process ID of process (process ID "60") relating to OBJ2)     (2-6)

(Inter-process weight between process (process ID "0") relating to OBJ1 and process (process ID "0") relating to OBJ2)*(Value of process ID of process (process ID "0") relating to OBJ1)*(Value of process ID of process (process ID "0") relating to OBJ2)     (2-7)

(Weight of "event ID")*(Value of "event ID" of OBJ1)*(Value of "event ID" of OBJ2)     (2-8)

When the degree of similarity between the objects OBJ1 and OBJ2 is determined, it is assumed that values indicated by an arrow P1 illustrated in FIG. 9 are input to the calculation formula (2-1) and "1" is substituted for the (Weight of "write frequency") as described above.

It is assumed that values indicated by an arrow P2 illustrated in FIG. 9 are input to the calculation formula (2-2) and "1" is substituted for the (Weight of "read frequency") as described above.

It is assumed that values (in decimal notation) indicated by an arrow P3 illustrated in FIG. 9 are input to the calculation formula (2-3) and "1" is substituted for the (Weight of "generation time") as described above.

It is assumed that a value ("1.0") indicated by an arrow Q1 illustrated in FIG. 11 is input to the "Inter-user weight" in the calculation formula (2-4), based on the user IDs ("10", "20") indicated by an arrow P4 illustrated in FIG. 9.

It is assumed that a value ("1.0") indicated by an arrow Q2 illustrated in FIG. 11 is input to the "inter-user weight" in the calculation formula (2-5), based on the user IDs ("0", "0") indicated by the arrow P4 illustrated in FIG. 9.

It is assumed that a value ("0.8") indicated by an arrow Q3 illustrated in FIG. 12 is input to the "inter-process weight" in the calculation formula (2-6), based on the process IDs ("50", "60") indicated by an arrow P5 illustrated in FIG. 9.

It is assumed that a value ("1.0") indicated by an arrow Q4 illustrated in FIG. 12 is input to the "inter-process weight" in the calculation formula (2-7), based on the process IDs ("0", "0") indicated by the arrow P5 illustrated in FIG. 9.

It is assumed that values indicated by an arrow P6 illustrated in FIG. 9 are input to the calculation formula (2-8) and "1" is substituted for the (Weight of "event ID") as described above.

Since the denominator of the calculation formula (2) is the inner product of the objects OBJ1 and OBJ2, the product of calculation formulas (2-9) and (2-10) below is determined.

SQRT(Value of "write frequency"^2+Value of "read frequency"^2+Value of "generation time"^2+ Value of "user ID"^2+Value of "process ID"^2+ Value of "event ID"^2 of OBJ1)     (2-9)

SQRT(Value of "write frequency"^2+Value of "read frequency"^2+Value of "generation time"^2+ Value of "user ID"^2+Value of "process ID"^2+ Value of "event ID"^2 of OBJ2)     (2-10)

By performing the above substitutions, cost) of the objects OBJ1 and OBJ2 is determined to be 0.959, which indicates that the objects OBJ1 and OBJ2 are similar,

1-5 Processing for Correcting Weight in Storage System according to One Embodiment Processing for correcting the inter-user weight and processing for correcting the inter-process weight that are performed by the weight control unit 52 in the storage system 1 according to the present embodiment will be described.

The processing for correcting the inter-user weight performed by the weight control unit 52 of the storage system 1 according to the present embodiment will be described first with reference to FIG. 13, parts (a) and (b) of FIG. 14, and parts (a) and (b) of FIG. 15 by using a flowchart (SU1 and SU2) illustrated in FIG. 16.

FIG. 13 is a diagram illustrating the meta-information 25 of objects "OBJ10" to "OBJ30", which is used in the description of the processing for correcting the inter-user weight.

Part (a) of FIG. 14 is a diagram illustrating the user-related weight information 72 (initial values) that is yet to be corrected in the present embodiment, and part (b) of FIG. 14 is a diagram illustrating the user-related weight information 72 that has been corrected in the present embodiment For example, parts (a) and (b) of FIG. 14 illustrate weights between two users among the user having the user ID of "10", the user having the user ID of "50", and the user having the user ID of "40".

The initial values illustrated in part (a) of FIG. 14 may be set by the administrator or may be set at random.

Part (a) of FIG. 15 is a diagram illustrating the degrees of similarity calculated based on the calculation formula (2) by using the meta-information 25 illustrated in FIG. 13 and the inter-user weight (initial values; see part (a) of FIG. 14) that is yet to be corrected. Part (b) of FIG. 15 is a diagram illustrating the degrees of similarity calculated based on the calculation formula (2) by using the meta-information 25 illustrated in FIG. 13 and the inter-user weight (see part (b) of FIG. 14) that has been corrected.

FIG. 16 is a flowchart for describing the processing for correcting the inter-user weight in the present embodiment.

It is assumed that processing indicated by step SU1 is started in response to the degree-of-similarity calculation unit 51 of the archiver manager 50 receiving a write request from a user, for example.

In step SU1, the weight control unit 52 calculates the absolute value of a difference between values of the user IDs for all combinations of the user IDs, and determines the total sum thereof (total sum of the absolute values of the differences between the values of the user IDs).

In part (a) of FIG. 14, for example, all the combinations of the user IDs are three combinations, that is, a combination of the user IDs "10" and "50", a combination of the user IDs "10" and "40", and a combination of the user IDs "40" and "50". The absolute value of the difference between the values of the user IDs is calculated for these combinations. Then, 40 (|10-50|), 30 (|10-40|), and 10 (↑40-50|) are obtained. The total sum of these absolute values calculated is determined. Then, 40+30+10=80 is obtained.

Subsequently in step SU2, the weight control unit 52 corrects the weight by using calculation formula (3) below.

Corrected inter-user weight=(Inter-user weight yet to be corrected)×(Value of user ID/Total sum of absolute values of differences between values of user IDs+1) (3)

In part (a) of FIG. 14, for example, the initial value (weight yet to be corrected) of the inter-user weight between the user having the user ID of "10" and the user having the user ID of "40" is "0.4" (see an arrow R1). When this weight is corrected by using the calculation formula (3) above, 0.4×(40/80+1)=0.6 is obtained. This indicates that the weight is corrected to the weight illustrated in part (b) of FIG. 14 (see an arrow R2). The processing then ends.

When the degree of similarity is determined based on the calculation formula (2) by using the inter-user weight that has been corrected (see part (b) of FIG. 14), a value illustrated in part (b) of FIG. 15 is obtained. As a result of correcting the inter-user weight from the value illustrated in part (a) of FIG. 14 to the value illustrated in part (b) of FIG. 14, the degree of similarity also changes from the value illustrated in part (a) of FIG. 15 to the value illustrated in part (b) of FIG. 15.

As described above, in the present embodiment, the weight between a plurality of users who are entities that actually use objects, that is, the relation between the users, is reflected when the degree of similarity between the objects is determined. In addition to the above, in the present embodiment, the degree of similarity between the objects is determined by reflecting the weight between a plurality of processes executed in association with the objects, that is, the relation between the processes. Processing for correcting the weight between a plurality of processes executed in association with objects will be described below by using a flowchart (SP1 and SP2) illustrated in FIG. 19 with reference to FIG. 13, parts (a) and (b) of FIG. 17, and parts (a) and (b) of FIG. 18.

Part (a) of FIG. 17 is a diagram illustrating the process-related weight information 74 (initial values) that is yet to be corrected in the present embodiment. Part (b) of FIG. 17 is a diagram illustrating the process-related weight information 74 that has been corrected in the present embodiment.

Parts (a) and (b) of FIG. 17 illustrate weights between two processes among three processes that are a process having the process ID of "10", a process having the process ID of "50", and a process having the process ID of "40".

Part (a) of FIG. 17 illustrates initial values of the inter-process weight in the present embodiment. The initial values may be set by the administrator or may be set at random.

Part (a) of FIG. 18 is a diagram illustrating the degrees of similarity calculated based on the calculation formula (2) by using the meta-information 25 illustrated in FIG. 13 and the inter-process weight (initial values; see part (a) of FIG. 17) yet to be corrected. Part (b) of FIG. 18 is a diagram illustrating the degrees of similarity calculated based on the calculation formula (2) by using the meta-information 25 illustrated in FIG. 13 and the inter-process weight (see part (b) of FIG. 17) that has been corrected.

FIG. 19 is a flowchart for describing the processing for correcting the inter-process weight in the present embodiment.

It is assumed that the processing illustrated in step SP1 is started in response to, for example, the degree-of-similarity calculation unit 51 of the archiver manager 50 receiving a write request from a process. It is assumed that before performing the processing illustrated in step SP1, the weight control unit 52 issues a request to the meta-information extraction unit 22 of the proxy server 20 and receives the meta-information 25 related to the request.

In step SP1, the weight control unit 52 calculates the absolute value of a difference between values of the process IDs for all the combinations of the process IDs, and determines the total sum thereof (total sum of the absolute values of the differences between the values of the process IDs).

In part (a) of FIG. 17, for example, all the combinations of the process IDs are three combinations, that is, a combination of the process IDs "10" and "50", a combination of the process IDs "10" and "40", and a combination of the process IDs "40" and "50". The absolute value of the difference between the values of the process IDs is calculated for these combinations. Then, 40 (|10-50|), 30 (|10-40|), and 10 (|40-50|) are obtained. The total sum of these absolute values calculated is determined. Then, 40+30+10=80 is obtained.

Subsequently in step SP2, the weight control unit 52 corrects the weight by using calculation formula (4) below.

Corrected inter-process weight=(Weight of inter-process weight yet to be corrected)×(Value of process ID/Total sum of absolute values of differences between values of process IDs+1) (4)

In part (a) of FIG. 17, for example, the initial value of the inter-process weight (weight yet to be corrected) between the process having the process ID of "10" and the process having the process ID of "40" is "0.5"(see an arrow R3). When this weight is corrected by using the calculation formula (4) above, the corrected weight is determined to be 0.5×(40/80+1)=0.75. This indicates that the weight is corrected to the weight illustrated in part (b) of FIG. 17 (see an arrow R4). The processing then ends.

When the degree of similarity is determined based on the calculation formula (2) by using the inter-process weight that has been corrected (see part (b) of FIG. 17), a value illustrated in part (b) of FIG. 18 is obtained. As a result of correcting the inter-process weight from the value illustrated in part (a) of FIG. 17 to the value illustrated in part (b) of FIG. 17, the degree of similarity also changes from the value illustrated in part (a) of FIG. 18 to the value illustrated in part (b) of FIG. 18.

In the present embodiment, by performing the processing for correcting the weight described above with reference to FIGS. 12 to 19, the weight is corrected so that the weight increases for users or processes having a greater correlation (co-occurrence).

In the present embodiment, these weights are corrected in response to receipt of a write request from a user; however, the weights may be corrected at a given timing in response to co-occurrence, user re-call, a change in use state, and so on. This enables the actual operation state to be reflected on the user-related weight or process-related weight substituted into the calculation formula (2) above and enables the degree of similarity between objects to be accurately calculated.

Not only the relation between users but also the relation between processes are taken into consideration. This enables the degree of similarity between objects to be determined in consideration of a plurality of elements which are used when the objects are used.

Processing for continuously correcting the aforementioned inter-user weight and the aforementioned inter-process weight will be described next with reference to FIGS. 21A and 21B by using FIG. 20.

FIG. 20 is a diagram illustrating processing for correcting the inter-user weight and the inter-process weight according to the present embodiment.

FIGS. 21A and 21B are a diagram illustrating an overview of the processing for correcting the inter-user weight and the inter-process weight in the present embodiment.

It is assumed that processing in step C1 is started in response to receipt of a write request from a user. As described above, the "user ID" and the "process ID" included in the meta-information 25 are also referred to as vector elements.

In step C1, the weight control unit 52 calculates, for each vector element of the meta-information 25, the total sum of absolute values of differences between values of the IDs. In the present embodiment, the total sum of absolute values of differences between values of the IDs is calculated for the user ID and the process ID which are the vector elements.

In the example in FIGS. 21A and 21B, all the combinations of the user IDs are three combinations, that is, a combination of the user IDs "10" and "50", a combination of the user IDs "10" and "40", and a combination of the user IDs "40" and "50". The absolute value of the difference between the values of the user IDs is calculated for these combinations. Then, 40 (110-501), 30 (110-401), and 10 (140-501) are obtained. The total sum of these absolute values calculated is determined. Then, 40+30+10=80 is obtained (see an arrow D1 in FIGS. 21A and 21B). Likewise, the total sum of the absolute values of the differences between values of the process IDs is calculated for the process ID. Then, 80 is obtained (see the arrow D1 in FIGS. 21A and 21B).

Subsequently in step C2, the weight control unit 52 detects the vector element having the largest total sum among those calculated in step C1. In the example in FIGS. 21A and 21B, the total sums for the user ID and the process ID are equal to "80". In such a case, the weight for the user ID (inter-user weight) is corrected first in the present embodiment (see A1 in FIGS. 21A and 21B).

Subsequently in step C3, the weight control unit 52 corrects the weight for the vector element detected in step C2 by using the calculation formula (3) above (see A1-1 in FIGS. 21A and 21B). The inter-user weight after this correction (corrected inter-user weight) is indicated by an arrow D2 in FIGS. 21A and 21B. Since this processing for correcting the weight is substantially the same as the calculation of the weight by using the calculation formula (3) described above with reference to FIGS. 14 to 16, the description thereof is omitted here.

Subsequently in step C4, the degree-of-similarity calculation unit 51 calculates the degree of similarity based on the calculation formula (2) by using the weight corrected in step C3 (see A1-2 in FIGS. 21A and 21B). The calculated degree of similarity (the degree of similarity after the correction) is indicated by an arrow D3 in FIGS. 21A and 21B. Since this processing is substantially the same as the calculation of the degree of similarity by using the calculation formula (2), which has been described with reference to FIGS. 14 to 16, the description thereof is omitted herein.

Subsequently in step C5, the weight control unit 52 determines whether or not the processing for correcting the weight is performed (the weight is checked) for all the vector elements detected in step C2. If it is determined that the processing for correcting the weight is not performed for all the vector elements (see "No" in step C5), the processing proceeds to step C6. If it is determined that the processing for correcting the weight is performed for all the vector elements (see "Yes" in step C5), the processing proceeds to step C8.

In the example illustrated in FIGS. 21A and 21B, the weight is corrected only for the user ID and the weight for the process ID is not corrected. Therefore, the processing branches to No in step C5 to proceed to step C6.

In step C6, the degree-of-similarity calculation unit 51 determines whether or not the degrees similarity for all objects exceed a degree-of-similarity criterion. In the present embodiment, the degree-of-similarity criterion is set to a degree of similarity of "0.8". When the value of the degree of similarity is equal to or greater than "0.8", the degree-of-similarity calculation unit 51 determines that the degree of similarity between the objects exceeds the degree-of-similarity criterion. In the present embodiment, the degree-of-similarity criterion is set to a degree of similarity of "0.8"; however, the value is not limited to this value.

If it is determined in step C6 that the degrees of similarity exceed the degree-of-similarity criterion (see "Yes" in step C6), the processing ends. If it is determined that the degrees of similarity do not exceed the degree-of-similarity criterion (see "No" in step C6), the processing proceeds to step C7.

In the example illustrated in FIGS. 21A and 21B, since there are objects for which the degree of similarity does not exceed the degree-of-similarity criterion (see an arrow D4 in FIGS. 21A and 21B), the processing branches to "No" in step C6 to proceed to step C7.

In step C7, the degree-of-similarity calculation unit 51 detects the vector element for which the total sum calculated in step C1 is the next largest. The processing then returns to step C3. In the example illustrated in FIGS. 21A and 21B, the process ID is detected as the vector element for which the total sum calculated in step C1 is the next largest, and the processing for correcting the weight (inter-process weight) is performed for the process ID (see B1 in FIGS. 21A and 21B). The inter-process weight that has been corrected (corrected inter-process weight) is indicated by an arrow D5 in FIGS. 21A and 21B. The weight is corrected by using the calculation formula (3) above (see B1-1 in FIGS. 21A and 21B), and the degree of similarity is calculated by using the calculation formula (2) (see B1-2 in FIGS. 21A and 21B). Since the processing for correcting the weight and the processing for calculating the degree of similarity are substantially the same as the calculations of the weight and the degree of similarity by using the calculation formulas (2) and (3), which have been described above with reference to FIGS. 17 to 19, the description thereof is omitted here, In step C8, the degree-of-similarity calculation unit 51 corrects (updates) the user-related weight information 72, the process-related weight information 74, and the degree-of-similarity information 75 based on a weight for which the degree of similarity is the closest to the degree-of-similarity criterion.

In the example illustrated in FIGS. 21A and 21B, as a result of steps C1 to C8, the degree of similarity is calculated by using the corrected inter-process weight and the values of the degrees of similarity for all the objects are equal to or greater than "0.8". In this case, the degree-of-similarity calculation unit 51 determines that the degrees of similarity exceed the degree-of-similarity criterion in step C6, and the processing ends (see an arrow D6 in FIGS. 21A and 21B).

The above result indicates that the values of the process IDs are considered to be more important than the values of the user IDs in determining the degree of similarity in the example illustrated in FIGS. 21A and 21B.

1-6 Processing for Controlling Writing in Storage System according to One Embodiment As an example of the embodiment configured as described above, processing for controlling writing performed in the storage system 1 will be described in accordance with a sequence chart (steps T1 to T15) illustrated in FIG. 22 with reference to parts (a) to (c) of FIG. 23

FIG. 22 is a sequence chart for describing control on writing of an object according to the present embodiment. FIG. 22 illustrates processing from writing, in response to receipt of a request for writing an object from a user, the object in the archive storage 46 to transmitting a notification of end of the writing.

Part (a) of FIG. 23 is a diagram illustrating degrees of similarity between objects that are yet to be corrected in the present embodiment. Part (b) of FIG. 23 is a diagram illustrating degrees of similarity to an object newly generated in the present embodiment. Part (c) of FIG. 23 is a diagram illustrating degrees of similarity that have been corrected in the present embodiment Part (a) of FIG. 23 illustrates the degrees of similarity between the objects "OBJ1" to "OBJ5" before correction is made.

As illustrated in part (a) in FIG. 23, it is assumed that the objects "OBJ1" to "OBJ3" are written in an archive "Archive 1" of the archive storage 46 before the correction.

It is also assumed that the objects "OBJ4" and "OBJ5" are written in an archive "Archive 2" of the archive storage 46 before the correction.

In the example illustrated in part (a) of FIG. 23, it is assumed that the object "OBJ1" is at the head of the archive "Archive 1" and that the objects are written in the archive in an order indicated by an arrow E0 illustrated in part (a) of FIG. 23 before the correction. That is, it is assumed that the object "OBJ2" that is the most similar to the object "OBJ1" is appended to the object "OBJ1", and the object "OBJ3" that is the most similar to the object "OBJ1" next to the object "OBJ2" is appended to the object "OBJ2". This order of writing "OBJ1", "OBJ2", and "OBJ3" is referred to as a writing order.

In step T1 illustrated in FIG. 22, the user transmits a request for writing an object to the application server 10. In FIG. 22, the case where the user makes a request for writing an object "OBJ6" will be described as an example.

Subsequently in step T2, the application server 10 requests the object server 30 to write the object "OBJ6" via the proxy server 20. It is assumed that the object server 30 receives the object "OBJ6" via the proxy server 20 and stores the object "OBJ6" in the object storage 31 thereof.

Subsequently in step T3, the application server 10 requests the archiver server 40 to write the object via the proxy server 20. In FIG. 22, it is assumed that the application server 10 designates the objects "OBJ1" to "OBJ6" and transmits the write request to the archiver server 40 by way of example.

In the sequence chart illustrated in FIG. 22, the write request in step T3 is transmitted subsequently to the write request in step T2; however, these requests may be transmitted at the same time or the order may be opposite.

Subsequently in step T4, the degree-of-similarity calculation unit 51 of the application server 10 calculates, by using the calculation formula (2) above, the degrees of similarity between the objects "OBJ1" to "OBJ6" received from the archiver server 40.

Part (b) of FIG. 23 illustrates the degrees of similarity between the write target object "OBJ6" and the other objects ("OBJ1" to "OBJ5"), which are calculated by the degree-of-similarity calculation unit 51 by using the calculation formula (2) above.

As described above, in the present embodiment, the degree-of-similarity calculation unit 51 determines that objects are similar if the degree of similarity between the objects calculated by using the calculation formula (2) above is 0.8 or greater, and determines that the objects are not similar if the degree of similarity is less than 0.8. Accordingly, referring to part (b) of FIG. 23, the degree-of-similarity calculation unit 51 determines that the write target object "OBJ6" is similar to the objects "OBJ1" and "OBJ2" and are not similar to the objects "OBJ3" to "OBJ5".

Subsequently in step T5, the degree-of-similarity calculation unit 51 determines the write destination archive based on the degrees of similarity calculated in the step T4. Since it is determined in step T4 that the write target object "OBJ6" is similar to the objects "OBJ1" and "OBJ2", the write destination archive of the object "OBJ6" is determined to be the archive "Archive 1" which is the same archive as that of the objects "OBJ1" and "OBJ2".

When the object "OBJ3" is focused, the object "OBJ3" is written in the archive "Archive 1" before the correction (see an arrow E1 in part (a) of FIG. 23). However, when the new object "OBJ6" is written, the degree of similarity between the objects "OBJ3" and "OBJ6" is determined to be "0.721" (see an arrow E2 in part (b) of FIG. 23) and it is determined that the object "OBJ3" is not similar to the object "OBJ6". For this reason, it is not desirable to write the object "OBJ3" in the same archive ("Archive 1") as the write destination of the object "OBJ6". Accordingly, the degree-of-similarity calculation unit 51 determines (changes) the write destination archive of the object "OBJ3" to be the archive "Archive 2" (see an arrow E4 in part (c) of FIG. 23).

The degree-of-similarity calculation unit 51 determines the order of writing to the archive storage 46 based on the degrees of similarity calculated in step T4.

Referring to the example illustrated in part (a) of FIG. 23, when the head object of the archive "Archive 1" is the object "OBJ1", the degree-of-similarity calculation unit 51 writes the object having a stronger relation to the object "OBJ1" at a location closer to the location of the object "OBJ1" in the present embodiment.

For example, the degree-of-similarity calculation unit 51 writes the object "OBJ2", which is the object most similar to the object "OBJ1" among the objects ("OBJ1", "OBJ2", and "OBJ6") whose write destination archive is the archive "Archive 1", subsequently to the object "OBJ1". The degree-of-similarity calculation unit 51 writes the object "OBJ6", which is the object that is the second most similar to the object "OBJ1", subsequently to the object "OBJ2" (see an arrow E3 in part (c) of FIG. 23). That is, the degree-of-similarity calculation unit 51 determines the writing order to be "OBJ1", "OBJ2", and "OBJ6".

When the head object of the archive "Archive 2" is the object "OBJ3", the degree-of-similarity calculation unit 51 writes the object having a stronger relation to the object "OBJ3" at a location closer to the location of the object "OBJ3" in the present embodiment.

For example, the degree-of-similarity calculation unit 51 writes the object "OBJ4", which is the object most similar to the object "OBJ3" among the objects ("OBJ3", "OBJ4", and "OBJ5") whose write destination archive is the archive "Archive 2", subsequently to the object "OBJ3". The degree-of-similarity calculation unit 51 then writes the object "OBJ5", which is the object that is the second most similar to the object "OBJ3", subsequently to the object "OBJ4". That is, the degree-of-similarity calculation unit 51 determines the writing order to be "OBJ3", "OBJ4", and "OBJ5".

Subsequently in step T6, the degree-of-similarity calculation unit 51 transmits a list of objects to be written ("OBJ1" to "OBJ6") to the archive control unit 61. The degree-of-similarity calculation unit 51 further transmits the write destination archive and the writing order of each object determined in step T5 to the archive control unit 61.

Subsequently in step T7, the archiver manager 50 requests the object server 30 for a move call for the objects included in the list received in step T6. The processing for this request is performed by the archive control unit 61 of the archiver manager 50.

Subsequently in step T8, the object control unit 32 of the object server 30 reads the objects requested in step T7 from the object storage 31.

The object control unit 32 copies the read objects in the stub storage 47 of the archiver server 40 (for example, transmits the copy of the read objects). In the present embodiment, the copy to the stub storage 47 is performed by the stub control unit 62 of the archiver server 40.

Subsequently in step 19, the archiver manager 50 instructs the archive control unit 61 to write, in the archive storage 46, the objects copied to the stub storage 47 in step T8. This instruction is performed by the archive control unit 61 of the archiver manager 50.

Subsequently in step T10, the archiver manager 50 creates an archive file ("Archive 1" or "Archive 2") for writing the object in the archive storage 46. This creation is performed by the archive control unit 61 of the archiver manager 50.

Subsequently in step T11, the archiver manager 50 writes the objects in the archive storage 46. This writing is performed based on the write destination archive and the writing order of each object received in step T6. This writing is performed by the archive control unit 61 of the archiver manager 50.

Subsequently in step T12, the archiver manager 50 creates the file name of the archived object. This creation is performed by the archive control unit 61 of the archiver manager 50.

Subsequently in step T13, in response to the end of writing of the objects in the archive storage 46, the archiver manager 50 transmits a write end notification to the object server 30. This transmission is performed by the archive control unit 61 of the archiver manager 50.

Subsequently in step T14, the archiver agent 60 transmits the write end notification to the application server 10 via the proxy server 20, This transmission is performed by the archive control unit 61 of the archiver manager 50.

Subsequently in step T15, the application server 10 transmits the write end notification to the user terminal 2, This transmission is performed by the request transmission/reception unit 11 of the archiver manager 50.

As descried above, as a result of steps T1 to T15 described above, the object that is the target of the current write request made by the user is appended to an object having a large degree of similarity in the archive storage 46. Consequently, since the object which is highly likely to be read by the user thereafter is arranged in the vicinity of the object, the time taken for reading is successfully reduced, 2 Effects As described above, the storage system 1 according to the present embodiment determines the writing order such that objects having a greater degree of similarity are written at closer locations on a sequential access medium (the archive storage 46) for example, and writes the objects in the archive storage 46. This successfully reduces, when the objects are read from the sequential access medium, the time taken for locating the objects in the archive storage 46, and consequently reduces the time taken for reading the objects.

The storage system 1 determines the write destination archive based on the calculated degrees of similarity between the objects. This makes it possible to write similar objects in the same archive and to write an object whose degree of similarity reduces as a result of generation of a new object in a different archive.

3 Others

The techniques according to the one embodiment described above may be modified or changed as follows and may be implemented.

In the one embodiment described above, the degree of similarity between objects are calculated in consideration of, as the weight, the relation between a plurality of users who use the objects and the relation between processes executed in response to requests made by the users; however, the configuration is not limited thereto. For example, the degree of similarity may be calculated in consideration of, as a weight, a relation between events that occur in response to requests made by the users and are identified by event. IDs in the meta-information 25.

In the one embodiment described above, both the relation between a plurality of users who use objects and the relation between processes executed in response to requests made by users are considered as weights; however, the degree of similarity may be calculated in consideration of the weight represented by one of these relations alone.

In the one embodiment described above, the processing for correcting the inter-user weight and the processing correcting the inter-process weight are started in response to receipt of a write request from a user; however, the configuration is not limited thereto, For example, the processing for correcting the weight may be started in response to occurrence of a correlation (co-occurrence).

In the one embodiment described above, the weight relating to the user IDs is corrected first when the total sums of absolute values of differences between values of the IDs for the user IDs and the process IDs are equal to each; however, the configuration is not limited thereto.

In the one embodiment described above, the file monitor 12 monitors processes that use an object; however, the target to be monitored is not limited to the processes and may include applications to be used, for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and configured to:
      perform control to store data on the memory;
      determine a correlation between a plurality of pieces of data, based on pieces of attribute information of the plurality of pieces of data; and
      dispose pieces of data having a high correlation among the plurality of pieces of data at neighboring locations on the memory, the memory is a sequential access medium, the processor is configured to:
   determine the correlation between the plurality of pieces of data, using at least one of a user-related weight indicating a correlation which is assigned to each pair of users included in a plurality of users and a process-related weight indicating a correlation which is assigned to each pair of processes included in a plurality of processes executed in response to requests made by the plurality of users;
   determine an order such that the plurality of pieces of data are disposed on the memory in descending order of the correlation;
   correct the user-related weight and generate a corrected user-related weight by calculating, for all pairs of the users, an absolute value of a difference between values of identifiers of the users of the respective pairs of the users, summing differences of the all pairs of the users to obtain a first summed difference and multiplying the user-related weight by a value obtained by dividing the user-related weight by the first summed difference and adding a specific value to a first divided result; and
   correct the process-related weight and generate a corrected process-related weight by calculating, for all pairs of the processes, an absolute value of a difference between values of identifiers of the processes of the respective pairs of the processes, summing differences of the all pairs of the processes to obtain a second summed difference and multiplying the process-related weight by a value obtained by dividing the process-related weight by the second summed difference and adding the specific value to a second divided result.

2. The information processing apparatus according to claim 1 wherein the user-related weight and the process-related weight are corrected based on monitoring information which is obtained by monitoring the plurality of processes.

3. The information processing apparatus according to claim 1, wherein each of the pieces of attribute information includes at least one of a frequency with which a corresponding piece of data is written, a frequency with which the corresponding piece of data is read, generation time of the corresponding piece of data, an identifier of a user using the corresponding piece of data, an identifier of a process executed in response to each request, or an identifier of an event that occurs in response to a request which is made by the user.

4. A non-transitory computer-readable recording medium having stored therein a storage control program for causing a computer to execute a process, the process comprising:
   determining a correlation between a plurality of pieces of data, based on pieces of attribute information of the plurality of pieces of data; and
   disposing pieces of data having a high correlation among the plurality of pieces of data at neighboring locations on a storage medium, the memory is a sequential access medium, the process further includes:
   determining the correlation between the plurality of pieces of data, using at least one of a user-related weight indicating a correlation which is assigned to each pair of users included in a plurality of users and a process-related weight indicating a correlation which is assigned to each pair of processes included in a plurality of processes executed in response to requests made by the plurality of users;
   determining an order such that the plurality of pieces of data are disposed on the memory in descending order of the correlation;
   correcting the user-related weight and generating a corrected user-related weight by calculating, for all pairs of the users, an absolute value of a difference between values of identifiers of the users of the respective pairs of the users, summing differences of the all pairs of the users to obtain a first summed difference and multiplying the user-related weight by a value obtained by dividing the user-related weight by the first summed difference and adding a specific value to a first divided result; and
   correcting the process-related weight and generating a corrected process-related weight by calculating, for all pairs of the processes, an absolute value of a difference between values of identifiers of the processes of the respective pairs of the processes, summing differences of the all pairs of the processes to obtain a second summed difference and multiplying the process-related weight by a value obtained by dividing the process-related weight by the second summed difference and adding the specific value to a second divided result.

5. The non-transitory computer-readable recording medium according to claim 4, wherein the user-related weight and the process-related weight are corrected based on monitoring information which is obtained by monitoring the plurality of processes.

6. The non-transitory computer-readable recording medium according to claim 4, wherein each of the pieces of attribute information includes at least one of a frequency with which a corresponding piece of data is written, a frequency with which the corresponding piece of data is read, generation time of the corresponding piece of data, an identifier of a user using the corresponding piece of data, an identifier of a process executed in response to each request, or an identifier of an event that occurs in response to a request which is made by the user.

7. A storage system comprising:
an application server configured to acquire data from a user;
a proxy server configured to store pieces of attribute information of a plurality of pieces of data; and
a storage control apparatus configured to perform control o store data on a memory, wherein the application server is configured to transmit the data which is acquired from the user to the storage control apparatus via the proxy server, and the storage control apparatus is configured to:
determine, based on attribute information of the received data, with reference to the pieces of attribute information stored in the proxy server, correlations between the received data and the plurality of pieces of data; and
dispose pieces of data having a high correlation at neighboring locations on the memory,
the memory is a sequential access medium,
the storage control apparatus is configured to:
determine the correlation between the plurality of pieces of data, using at least one of a user-related weight indicating a correlation which is assigned to each pair of users included in a plurality of users and a process-related weight indicating a correlation which is assigned to each pair of processes included in a plurality of processes executed in response to requests made by the plurality of users;
determine an order such that the plurality of pieces of data are disposed on the memory in descending order of the correlation;
correct the user-related weight and generate a corrected user-related weight by calculating, for all pairs of the users, an absolute value of a difference between values of identifiers of the users of the respective pairs of the users, summing differences of the all pairs of the users to obtain a first summed difference and multiplying the user-related weight by a value obtained by dividing the user-related weight by the first summed difference and adding a specific value to a first divided result; and
correct the process-related weight and generate a corrected process-related weight by calculating, for all pairs of the processes, an absolute value of a difference between values of identifiers of the processes of the respective pairs of the processes, summing differences of the all pairs of the processes to obtain a second summed difference and multiplying the process-related weight by a value obtained by dividing the process-related weight by the second summed difference and adding the specific value to a second divided result.

8. The storage system according to claim 7, wherein the user-related weight and the process-related weight are corrected based on monitoring information which is obtained by monitoring the plurality of processes.

9. The storage system according to claim 7, wherein each of the pieces of attribute information includes at least one of a frequency with which a corresponding piece of data is written, a frequency with which the corresponding piece of data is read, generation time of the corresponding piece of data, an identifier of a user using the corresponding piece of data, an identifier of a process executed in response to each request, or an identifier of an event that occurs in response to a request which is made by the user.

* * * * *